US009710829B1

(12) United States Patent
Sitapara et al.

(10) Patent No.: US 9,710,829 B1
(45) Date of Patent: Jul. 18, 2017

(54) METHODS, SYSTEMS, AND ARTICLES OF MANUFACTURE FOR ANALYZING SOCIAL MEDIA WITH TRAINED INTELLIGENT SYSTEMS TO ENHANCE DIRECT MARKETING OPPORTUNITIES

(71) Applicant: Intuit Inc., Mountain View, CA (US)

(72) Inventors: Ojas R. Sitapara, San Diego, CA (US); Anqi Chen, Shaker Heights, OH (US); Daniel Edward Reeves, Poway, CA (US); Ravindra Bindumadhav Kulkarni, San Diego, CA (US); Preetam Kumar Ojha, Boston, MA (US)

(73) Assignee: INTUIT INC., Mountain View, CA (US)

( * ) Notice: Subject to any disclaimer, the term of this patent is extended or adjusted under 35 U.S.C. 154(b) by 232 days.

(21) Appl. No.: 13/922,107

(22) Filed: Jun. 19, 2013

(51) Int. Cl.
*G06Q 30/00* (2012.01)
*G06Q 30/02* (2012.01)
*G06Q 50/00* (2012.01)

(52) U.S. Cl.
CPC ......... *G06Q 30/0276* (2013.01); *G06Q 50/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,600,796 B1* | 12/2013 | Sterne | ............... | G06Q 30/0201 705/7.29 |
| 8,726,400 B1* | 5/2014 | Granstrom | ......... | H04N 21/2187 709/203 |
| 8,818,788 B1* | 8/2014 | Mihalik | .............. | G06F 17/2785 704/1 |
| 2008/0256216 A1* | 10/2008 | Aarts | ..................... | G06Q 30/02 709/217 |
| 2009/0006285 A1* | 1/2009 | Meek | .................... | G06Q 10/10 706/12 |
| 2009/0171625 A1* | 7/2009 | Razdow | .............. | G06F 17/2765 702/187 |
| 2009/0281978 A1* | 11/2009 | Gordon | .................. | G06Q 10/10 706/52 |
| 2009/0326927 A1* | 12/2009 | Morin | ................... | G06F 17/276 704/10 |

(Continued)

*Primary Examiner* — Matthew T Sittner
(74) *Attorney, Agent, or Firm* — Vista IP Law Group LLP

(57) ABSTRACT

Disclosed are methods, systems, and articles of manufactures for analyzing user generated content items in social media networks with trained intelligent systems to create or enhance direct marketing opportunities. The method or the system monitors user generated content items in social media networks and identifies a relevant user generated content item that may be materialized into a direct marketing opportunity. The method or system further performs language processing on the relevant user generated content item and uses the processing results to prepare a response which is subsequently transmitted to the user to materialize the direct marketing opportunity. The method or system uses various intelligent logic processes or modules that may be further enhanced by machine learning techniques with human expert reviews and intervention to improve their respective accuracy, reliability, or confidence level.

34 Claims, 14 Drawing Sheets

(56) References Cited

U.S. PATENT DOCUMENTS

| | | | | |
|---|---|---|---|---|
| 2010/0082627 A1* | 4/2010 | Lai | G06F 17/30867 | 707/738 |
| 2010/0088182 A1* | 4/2010 | Ryder | G06Q 10/107 | 705/14.66 |
| 2010/0205550 A1* | 8/2010 | Chen | G06Q 30/02 | 715/760 |
| 2010/0280866 A1* | 11/2010 | Moon | G06Q 30/02 | 705/14.49 |
| 2011/0106612 A1* | 5/2011 | Roberts | G06Q 30/02 | 705/14.43 |
| 2011/0231182 A1* | 9/2011 | Weider | G06F 17/30864 | 704/9 |
| 2011/0246261 A1* | 10/2011 | Kassaei | G06Q 10/0639 | 705/7.38 |
| 2011/0258556 A1* | 10/2011 | Kiciman | G06Q 10/10 | 715/751 |
| 2012/0004983 A1* | 1/2012 | Borthwick | G06Q 30/02 | 705/14.45 |
| 2012/0011158 A1* | 1/2012 | Avner | G06F 17/2785 | 707/777 |
| 2012/0016735 A1* | 1/2012 | Park | G06Q 30/02 | 705/14.42 |
| 2012/0117459 A1* | 5/2012 | DeHaven | G06F 17/30864 | 715/234 |
| 2012/0215773 A1* | 8/2012 | Si | G06Q 30/02 | 707/723 |
| 2012/0254225 A1* | 10/2012 | Carter | G06F 17/30867 | 707/769 |
| 2012/0265819 A1* | 10/2012 | McGann | G06Q 30/00 | 709/204 |
| 2012/0290399 A1* | 11/2012 | England | G06Q 30/0282 | 705/14.66 |
| 2013/0013457 A1* | 1/2013 | Pulito | G06Q 50/01 | 705/26.61 |
| 2013/0054698 A1* | 2/2013 | Lee | G06Q 30/0259 | 709/204 |
| 2013/0297426 A1* | 11/2013 | Marx | G06Q 30/0269 | 705/14.66 |
| 2013/0317808 A1* | 11/2013 | Kruel | H04L 51/32 | 704/9 |
| 2014/0032562 A1* | 1/2014 | Arngren | G06F 17/3002 | 707/741 |
| 2014/0100835 A1* | 4/2014 | Majumdar | G06Q 10/047 | 703/11 |
| 2014/0108565 A1* | 4/2014 | Griffin | G06Q 50/01 | 709/206 |
| 2014/0156481 A1* | 6/2014 | Gilveli | G06Q 30/0631 | 705/35 |
| 2014/0279196 A1* | 9/2014 | Wilson | G06Q 30/0631 | 705/26.7 |

* cited by examiner

METHODS, SYSTEMS, AND ARTICLES OF MANUFACTURE FOR ANALYZING SOCIAL MEDIA WITH TRAINED INTELLIGENT SYSTEMS TO ENHANCE DIRECT MARKETING OPPORTUNITIES

BACKGROUND

Social media provides an Internet-based framework for people to create, share, and exchange user generated content in virtual communities. With the advance in mobile communication technologies and popularity, social media has become one of the major channels for people to communicate with each other and to publish user generated content. As social networking continues to gain popularity, the functions of social network websites have evolved from connecting maintaining social relations among individuals to providing more business oriented functions such as providing discussion forums for a group of individuals or organizations sharing some common interests in or issues with products or services.

Nonetheless, due to the nature of the social networks being started with social relations and thus the unique characteristics of social network websites, much of the dialog and conversations go unheard or unanswered by some real parties in interest even though a lot of dialog and conversations happen naturally in the social sphere. Many of the user generated content items contain business leads, but due to the sheer amount of information exchange, most of the business leads are lost in the sea of information exchange. For example, Twitter® averages 58 millions of tweets and 2.1 billion of Twitter search engine queries per day among 115 millions of Twitter users in May 2013. Although some social media networks have started grouping users with similar interest into communities, it is nonetheless close to a complete impossibility to ask human beings to sift through such a huge amount of information sharing and exchange on a daily basis to identify such business opportunities, much less materializing such business opportunities using direct marketing vehicles. Therefore, there is a need for a method and a system for analyzing social media with trained intelligent systems to enhance direct marketing opportunities.

SUMMARY

Disclosed are various embodiments of methods, systems, and articles of manufactures for analyzing social media with trained intelligent systems to enhance direct marketing opportunities. In some embodiments, the method or the system monitors and collects user generated content items from one or more social media networks (e.g., social media network website(s)), identifies relevant user generated content items that may be identified as relevant to some business leads by processing the user generated content items with intelligent logic systems, and automatically generates and transmits responses to such relevant user generated content items back to the users who originally created these relevant user generated content items as a direct marketing vehicle or a direct marketing tool.

In some embodiments, the intelligent logic systems may be further fine-tuned with machine training and human expert reviews and intervention to enhance the accuracy, reliability, or confidence level of the automatically generated responses that are undistinguishable from responses that are prepared by human experts. In these embodiments, the automatically generated responses are formulated or prepared in a natural language or a constructed language, instead of some formal languages. In some embodiments, the involvement of human experts in the machine learning or machine training aspects, at least in the early stage before various processes or modules are determined to be sufficiently accurate, further enhance the application and deployment of various processes or modules to areas where specialized and often complex expert knowledge is required.

In some embodiments, various modules and processes described herein are completely automated without human intervention, especially after such processes and modules have been determined to be sufficiently accurate and reliable via, for example, a plurality of training data sets. Therefore, various embodiments provide the ability to monitor the enormous amount of information exchange in social media networks and to extract useful business leads from such information exchange to create or enhance direct marketing opportunities without requiring human beings to monitor the information exchange, to identify relevant user generated content and to generate a response to the relevant user generated content.

Some embodiments described herein may act on a single user generated content item, with or without regard to whether or not the single user generated content item is a part of a trend in social media networks. These embodiments are directed at individually generating and transmitting individualized, personal responses to targeted users, rather than generating and transmitting a response to a public forum to provide an answer to a popular trend topic. Some other embodiments may nonetheless determine whether or not the issue or request in a specific user generated content item has exceeded a threshold number of occurrences among the enormous amount of information exchange on social media networks so as to constitute a trend topic and subsequently use mass marketing vehicles to attract the attention of a larger group of users having identical or substantially similar issues or requests. In these embodiments, although various embodiments may use mass marketing vehicles, various processes or modules described here may nonetheless individually generate individualized, personal responses for each of the larger group of users so as to use these individually generated individualized, personal responses as direct marketing vehicles.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-read-

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF ILLUSTRATED EMBODIMENTS

Various embodiments are directed to a method, system, and computer program product for analyzing social media with trained intelligent systems to enhance direct marketing opportunities. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of the present invention. Where certain elements of embodiments can be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration.

In some embodiments, the method or the system monitors user generated content items in social media networks and identifies a relevant user generated content item that may be materialized into a direct marketing opportunity. The method or system further performs language processing on the relevant user generated content item and uses the processing results to prepare a response which is subsequently transmitted to the user to materialize the direct marketing opportunity. The method or system uses various intelligent logic processes or modules that may be further enhanced by machine learning techniques with human expert reviews and intervention to improve their respective accuracy, reliability, or confidence level. More details about various processes or modules to implement various embodiments are further described below with reference to FIGS. 1-13.

Figure 1:
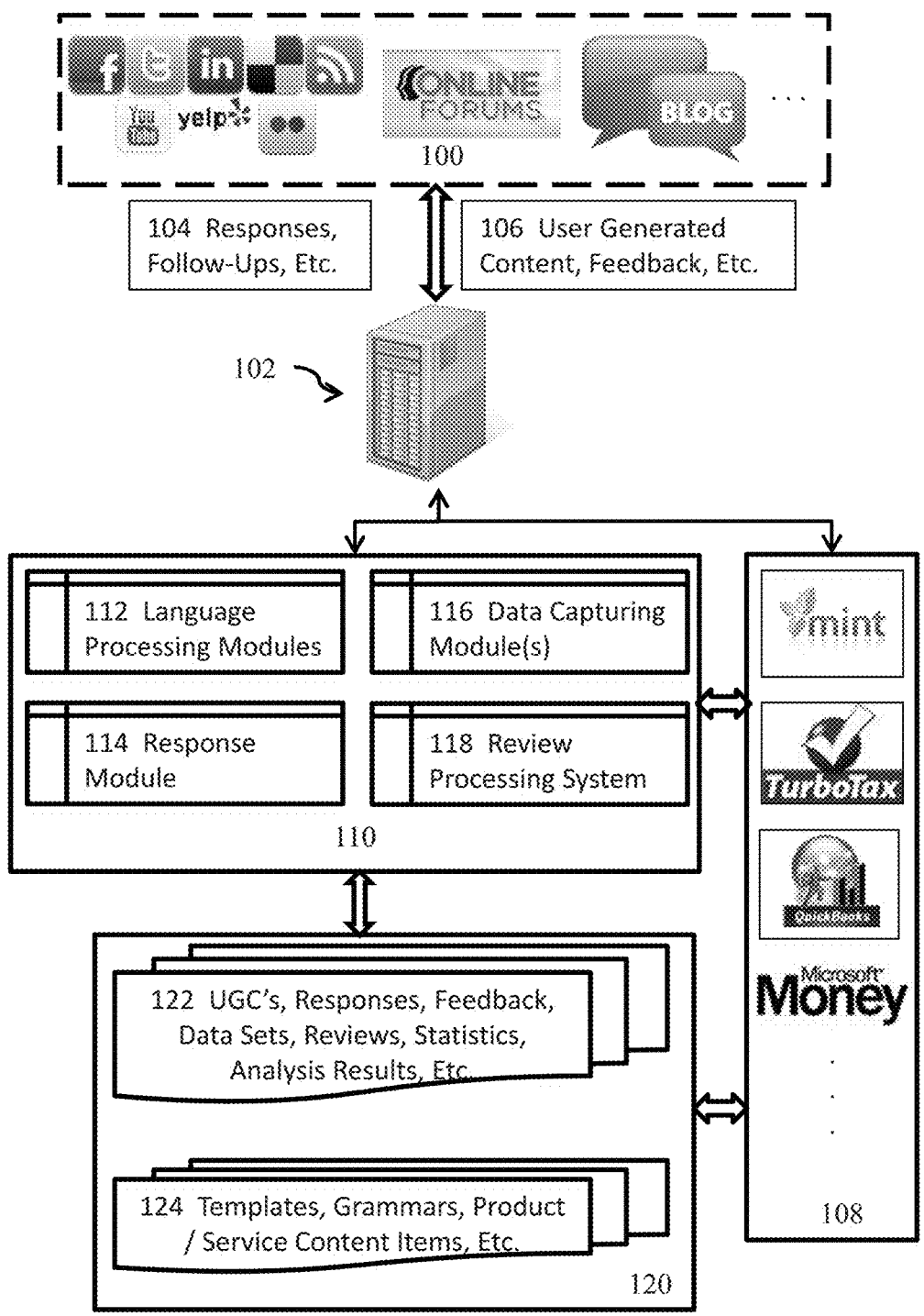
FIG. 1 illustrates an exemplary schematic diagram of one or more servers that execute various modules or processes and to analyze social media with trained intelligent systems to enhance direct marketing opportunities in some embodiments.

FIG. 1 illustrates an exemplary schematic diagram of one or more servers that execute various modules or processes and to analyze social media with trained intelligent systems to enhance direct marketing opportunities in some embodiments. More specifically, FIG. 1 illustrates a social media network 100 which provides the means of interactions for users or participants to create, share, and exchange information, data, ideas or processed information, opinions, work of authorship, etc. in virtual communities and networks.

The social media network 100 may include a plurality of individuals, organizations, or a combination thereof (hereinafter a user or users) and is organized by one or more social network sites, each of which provides a platform or framework for a set of the individuals, organizations, or a combination thereof to initiate or participate in some forms of conversations, posts, tweets, podcasts, messages, clicks, trends, electronic mails, instant messages, multimedia messages, searched items, etc. 104 (hereinafter user generated content or user generated content item(s)) to create, share, and exchange information, data, ideas or processed information, opinions, work of authorship, etc. Therefore, a user may comprise an individual human being, a group of individuals, an organization, a business entity (e.g., a corporation), or any combination thereof.

In some embodiments, a social media network 100 may correspond to or may be associated with one or more social network websites, one or more search engines, one or more online communities, one or more weblogs, one or more social blogs, one or more Internet forums, one or more microblogs, one or more wikis, one or more podcasts, etc. and may be collectively referred to as a social network site or a forum. One or more computing systems 102 may interact with the social media network via one or more connections to send to and to receive from the social media network 100. The one or more computing systems 102 may provide one or more products or services 108 such as but not limited to tax products or services (e.g., Turbo Tax® offered by Intuit, Inc.), personal finance management product(s) or service(s) (e.g., Mint.com® or Quicken® offered by Intuit, Inc. or Money® offered by Microsoft Corp.), budgeting product(s) or service(s) (e.g., Mint.com® or Quicken® offered by Intuit, Inc.), or financial management system of product(s) or service(s) (e.g., Quicken®, Quickbooks®, Intuit Online Payroll, GoPayment, etc. offered by Intuit, Inc.)

The one or more computing system 102 may comprise one or more modules 110 such as one or more language processing modules 112, a response module 114, one or more data capturing modules 116, or a review processing sub-system 118 in some embodiments. In some embodiments, the one or more computing system 102 may interact with one or more of the aforementioned modules 112, 114, 116, and 118 that are hosted on one or more other computing systems that are remote to the one or more computing systems 102 in a, for example, multi-tier server architecture or a computing grid architecture. In some embodiments, some or all of the modules 110 may be executed on a user's computing system.

It shall be noted that the various processes may be performed on one or more computing systems by their respective processors in conjunction with other peripheral components such as the ones described in the System Architecture Overview section, and various modules may be executed on one or more computing systems. Therefore, the one or more computing systems 102 may comprise a single computing system encompassing all the processes or modules or may comprise multiple computing systems in one or more tiers, whereas each of the one or more computing system 102 is responsible for some but not all the processes or modules.

The one or more computing systems 102 may interact with and thus read from and write to one or more persistent storage devices or a volatile, non-transitory computer readable medium 120, which may store thereupon, for example, various data, various information, user generated content, responses sent by the response module 114, user feedback, data sets for assisted or unassisted machine learning or training, various libraries for the execution of various processes or functions described herein, one or more content items of one or more products or services, expert reviews used for assisted machine learning, various statistics about the user generated content, responses, or user feedback, various analysis results, one or more data structures (e.g., relational or non-relational databases), etc. (122) in some embodiments.

The one or more persistent storage devices or a volatile, non-transitory computer readable medium 120, which may store thereupon, for example, one or more templates for various responses, grammars used for analyzing various pieces of information in natural language, or one or more content items related to the one or more products or services (124). The system may also comprise or interact with one or more forms of temporary storage such as some random access memory to temporarily store various data, variable or parameter values, objects, or other information required or need for the execution of various processes or modules described herein or processes or modules required or needed to support the execution of various processes or modules described herein. The one or more persistent storage devices 120 may be implemented in separate storage units such as any non-volatile computer readable, non-transitory storage media. In some embodiments, the one or more persistent storage devices or a volatile, non-transitory computer readable medium 120 may be implemented in a single storage unit. The one or more products or services 108 may also read from or write to the storage device or a volatile, non-transitory computer readable medium 120 in some embodiments. In some embodiments, the one or more computing systems 102 may also directly read from or write to the storage system or a volatile, non-transitory computer readable medium 120.

Figure 1A:
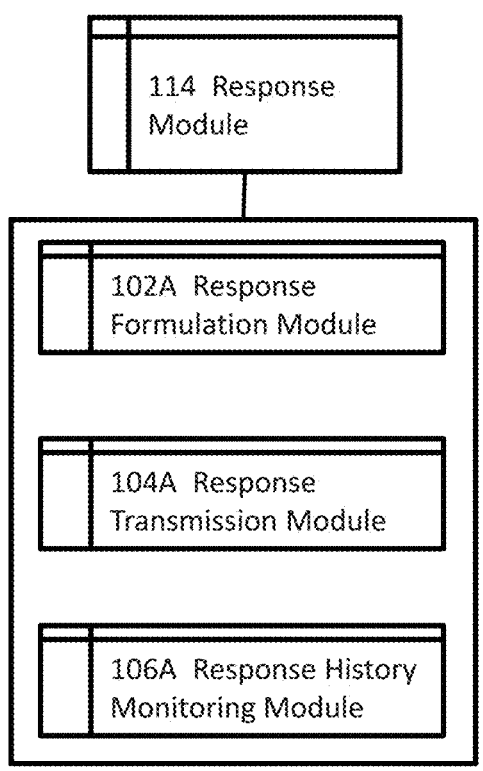
FIG. 1A illustrates more details of a part of the one or more servers in FIG. 1 in some embodiments.

FIG. 1A illustrates more details of a part of the one or more servers in FIG. 1 in some embodiments. More specifically, FIG. 1A illustrates some exemplary modules for the response module 114 in some embodiments. For example, the response module 114 may include a response formulation module 102A, which is used to formulate a response for a user generated content (e.g., a tweet, a forum post, etc.), a response transmission module 104A, which is used to transmit a formulated response to the targeted audience, or a response history monitoring module 106A, which is used to monitor, collect, and analyze various historical data or statistical data related to user generated content, responses, user feedback, or any other related data or information. More details about the response module 114 and the other modules in 110 will be described in subsequent paragraphs with reference to respective drawing figures.

Figure 2:
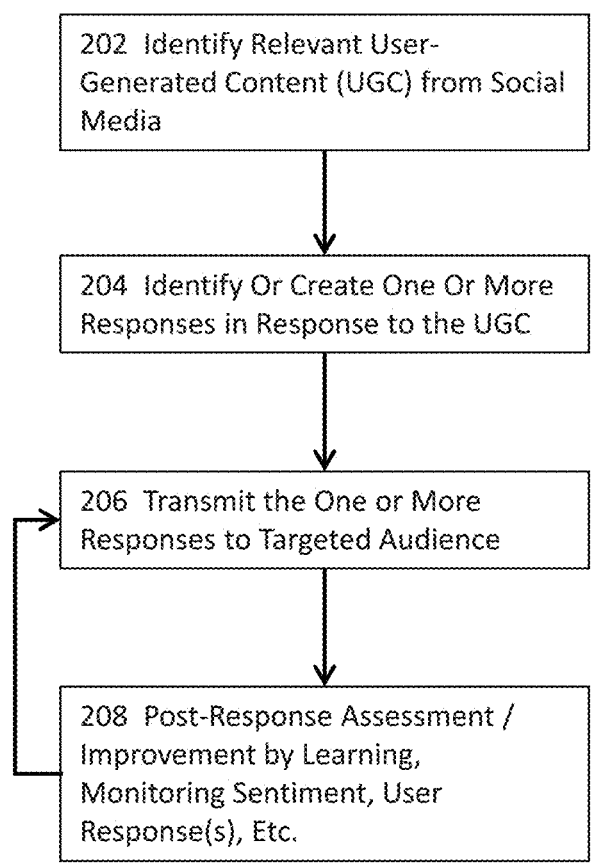
FIG. 2 illustrates a top level flow diagram for analyzing social media with trained intelligent systems to enhance direct marketing opportunities in some embodiments.

FIG. 2 illustrates a top level flow diagram for analyzing social media with trained intelligent systems to enhance direct marketing opportunities in some embodiments. In some embodiments, the method or the system for analyzing social media with trained intelligent systems to enhance direct marketing opportunities may comprise the respective process or module 202 for identifying relevant user generated content. User generated content may include tweets, blogs content, forum posts, messages, social network conversations, instant messages, multimedia messages, online articles, electronic mails, podcasts, or any other electronic work of authorship in some embodiments.

In some embodiments, the user generated content comprises at least a portion that is expressed in natural language. The method or the system may identify the user generated content either by using some external sources (e.g., a third-party data mining service or a data dredging service) or by performing some internal processes or executing some internal modules. In some embodiments, the process or module 202 may also identify or determine the user's information for direct marketing purposes. For example, the process or module 202 may identify the email address, the account name, or any other information that may be used to directly sent a response to the user who generated the user generated content to promote the sales of products of the company that also provides, for example, the one or more products or services 108.

In some embodiments, the method or the system may further comprise the respective process or module 204 for identifying or creating one or more responses in response to the user generated content. The response may include at least a portion that is expressed in natural language or conversational language that is automatically created by various modules or processes described herein in such a way that is understood by human beings in some embodiments. In these embodiments, the process or module 204 may use, for example, the response module 114 or the response formulation module 102A to automatically create at least the natural language or conversational language part of the response in a way that it is not distinguishable from a piece of writing by human beings.

In some embodiments, the response may also comprise, for example but not limited to, other content or one or more links to such other content including frequently asked questions (FAQs), online or offline help files, white papers, internal or external reports, journal articles, prior posts in various forums or sites, information from external sources (e.g., relevant information from Internal Revenue Service), etc. and may comprise the formats of text, graphics, audio, video, or any combinations thereof. In some embodiments, user generated content may be stored on some forms of non-transitory, volatile or non-volatile computer readable media with or without conversion or transformation. In some embodiments, collected user generated content may be categorized or classified based on one or more criteria.

In some embodiments, process or module 204 may also create from scratch or modify an existing response by conforming to one or more presentation requirements for one or more social media networks. A presentation requirement may comprise one or more requirements imposed by a target forum on the, for example but not limited to, number of words or letters allowed in the response, language used or permitted, display page layout requirement(s), protocol or standard compliance requirement(s), one or more presentation templates, rendering requirements (e.g., whether graphic elements are permitted in the representation, whether multimedia objects are permitted in the representation, whether frames or Server Side Includes (SSIs) are permitted, etc.), or limit(s) on character length, etc. in some embodiments.

For example, the language used or permitted requirement may comprise, for example but not limited to, HTML (hypertext markup language), SHTML (server side includes enabled HTML), XML (extensible markup language), XHTML (extensible hypertext markup language), SGML (standard generalized markup language), SMS (short messaging service), MMS (multimedia messaging service), secure messages, or any other suitable languages, etc. The layout requirement of the display page may comprise one or more requirements on, for example but not limited to, locations and areas that may be allocated for the representation or may be reserved for other purposes, or whether certain specific data types are permitted (e.g., whether the representation may include email address(es) or uniform resource locator(s).) The protocol or standard compliance requirement may comprise, for example but not limited to, SMTP (Simple Mail Transfer Protocol), ESMPT (Extended Simple Mail Transfer Protocol), SMTPS (SMTP secured by Secure Sockets Layer), POP (Post Office Protocol), IMAP (Internet Message Access Protocol), or other Internet standard for electronic mails, IPv6 (Internet Protocol version 6), IPv4 (Internet Protocol version 4, or other protocols for data packet transmissions, character encoding or character set requirement (e.g., ASCII, Extended Binary Coded Decimal Interchange Code, or various ISO character encodings, or any other requirement imposed on the representation. For example, if the response is to be transmitted as a tweet on Twitter®, the process or module 204 will identify or create the response to conform with the requirements imposed by Twitter®.

In some embodiments, the method or the system may further comprise the respective process or module 206 for transmitting the one or more responses to targeted audience. In some embodiments, the process or module 206 may transmit the response directly back to the user who generated the user generated content in the first place. For example, if a user posted a question about how a foreigner should do to file a tax return in an online forum, the process or module 202 may identify the post as a relevant user generated content; process or module 204 may identify (if the response is already existing) or create (if the response is not yet existing); and process 206 may transmit the response as a directly reply to the user in the online forum in some embodiments. As another example, if the process or module 202 also identifies, for example, the email address of the user.

The process or module 206 may transmit the response either as a directly reply to the user in the online forum or as an email directly sent to the user's email address. Combining with at least a portion expressed in natural language, the response may thus represent a personalized reply to the user question and thus may be used as a direct marketing vehicle to promote various products or services also offered by the company in some embodiments. In addition or in the alternative, process or module 206 may transmit the response to one or more other communication channels.

For example, the process or module 206 may transmit the response to one or more other social media networks as, for example, a post in a community of a social media network. In some embodiments, the method or the system may further comprise the respective process or module 208 for performing post-response assessment or improvement. For example, process or module 208 may assess the helpfulness or effectiveness of the transmitted response by, for example, soliciting user's feedback from the original user, monitoring the user subsequent user generated content, etc. in some embodiments. As another example, process or module 208 may improve various processes or modules described herein by, for example, invoking the machine learning processes or modules to improve the accuracy of at least one of various processes or modules described herein in some embodiments. As another example, process or module 208 may monitor, analyze, or evaluate user's sentiment, opinions, emotions, etc. by examining, for example, user's feedback or subsequent user generated content in some embodiments. More details about the post-response assessment or improvement will be described in subsequent paragraphs with reference to respective drawing figures.

Figure 3:
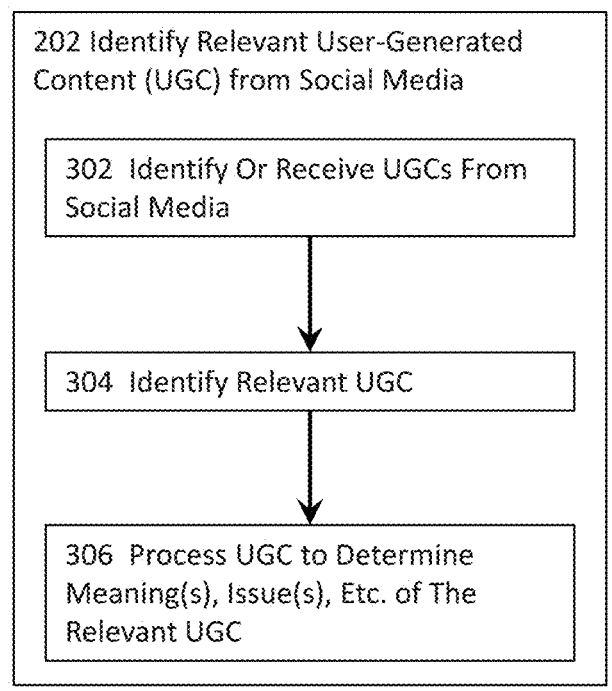
FIG. 3 illustrates more details for a part of the top level flow diagram illustrated in FIG. 2 in some embodiments.

FIG. 3 illustrates more details for a part of the top level flow diagram illustrated in FIG. 2 in some embodiments. More specifically, FIG. 3 illustrates more details about the process or module 202 for identifying a relevant user-generated content from the social media network in some embodiments. In these embodiments, the process or module 202 may comprise the respective process or module 302 for identifying or receiving one or more user generated content items from the social media network. For example, process or module 302 may monitor and collect one or more tweets or one or more posts from a social media network.

In some embodiments, the social media network may comprise Tweeter®, Facebook®, Myspace®, a weblog, a social blog, a microblog, a wiki, a video blog, etc. that is hosted by a server of the company providing one or more of the products or services 108 or of a third party. A user generated content item or user generated content (UGC) may comprise a piece of information that is created by a user and shared in any of such social media network in some embodiments. For example, a user generated content item may include a wall posting, a tweet, a web log, an instant message, a multimedia message, a post, a message, a video log, a podcast, etc. and may include textual content, graphics, voice, video, one or more links (e.g., universal resource locator (URL) or universal resource identifier (URI), etc.), or any combinations thereof in some embodiments.

The process or module 202 may further comprise the respective process or module 304 for identifying a relevant user generated content item from the one or more user generated content items identified or received at 302. In some embodiments, the process or module 304 may identify a relevant user generated content item from the one or more user generated content items identified or received at 302 by, for example, processing the one or more user generated content items. For example, process or module 304 may perform a filtering process on a user generated content item identified or received at 302 to identify relevant words or phrases based on, for example, some filtering rule(s) or keyword search against a plurality of keywords (e.g., "Turbo Tax", "Quicken", "tax return", "problem", "how", etc.) that are stored in one or more data structures such as one or more relational or non-relational databases or one or more tables.

In some embodiments, the process or module 304 identifies a relevant user generated content item from the one or more user generated content items by performing a data dredging that uses some data mining techniques to uncover pertinent relations in the one or more user generated content items identified or received at 302. More details about identifying a relevant user generated content item will be described in subsequent paragraphs with reference to respective drawing figures. In some embodiments, the process or module 202 may comprise the respective process or module 306 for processing the one or more user generated content items received or identified at 302 or the relevant user generated content item identified at 304 to determine their respective meanings, issues, etc.

It shall be noted that in some embodiments, the process or module 202 may first perform a quick and efficient process (e.g., a filtering process based on keyword search and match) on any user generated content item to determine whether the user generated content item is relevant and then may perform a more complex or thorough process (e.g., a natural language process) to determine the meaning, issues, etc. of a user generated content item. In some other embodiments, the process or module 202 may directly perform the more complex or thorough process on the one or more user generated content items identified or received at 302, while skipping the more efficient or quicker process. In some embodiments, the process or module 306 determines the meaning or issue(s) of the user generated content item by parsing the user generated content item and analyzing the parsing result (e.g., using a parse tree).

In some embodiments, the process or module 306 determines the meaning or issue(s) by performing a data mining process or a data dredging process. In some embodiments, the process or module 306 determines the meaning or issue(s) by performing a natural language processing on the relevant user generated content item identified at 304 or the one or more user generated content items identified at 302. In some embodiments, the process or module 202 illustrated in FIG. 3 comprises the scenario where the one or more user generated content items identified or received at 302 from the social media network include sufficiently detailed information indicating, for example, the contact information (e.g., email address, user identification, etc.) of the user who generated the user generated content item, what product(s) or services the one or more user generated content items are directed at, what the issue(s) or the meaning of the one or more user generated content items tell or imply, etc. such that the process or module 202 needs not perform further actions (e.g., to browse through, for example, the embedded URLs (uniform resource locators) associated with the one or more user generated content items to further examine what the one or more user generated content items are referring to. More details about processing the one or more user generated content items or the relevant user generated content item will be described in subsequent paragraphs with reference to respective drawing figures.

Figure 4:
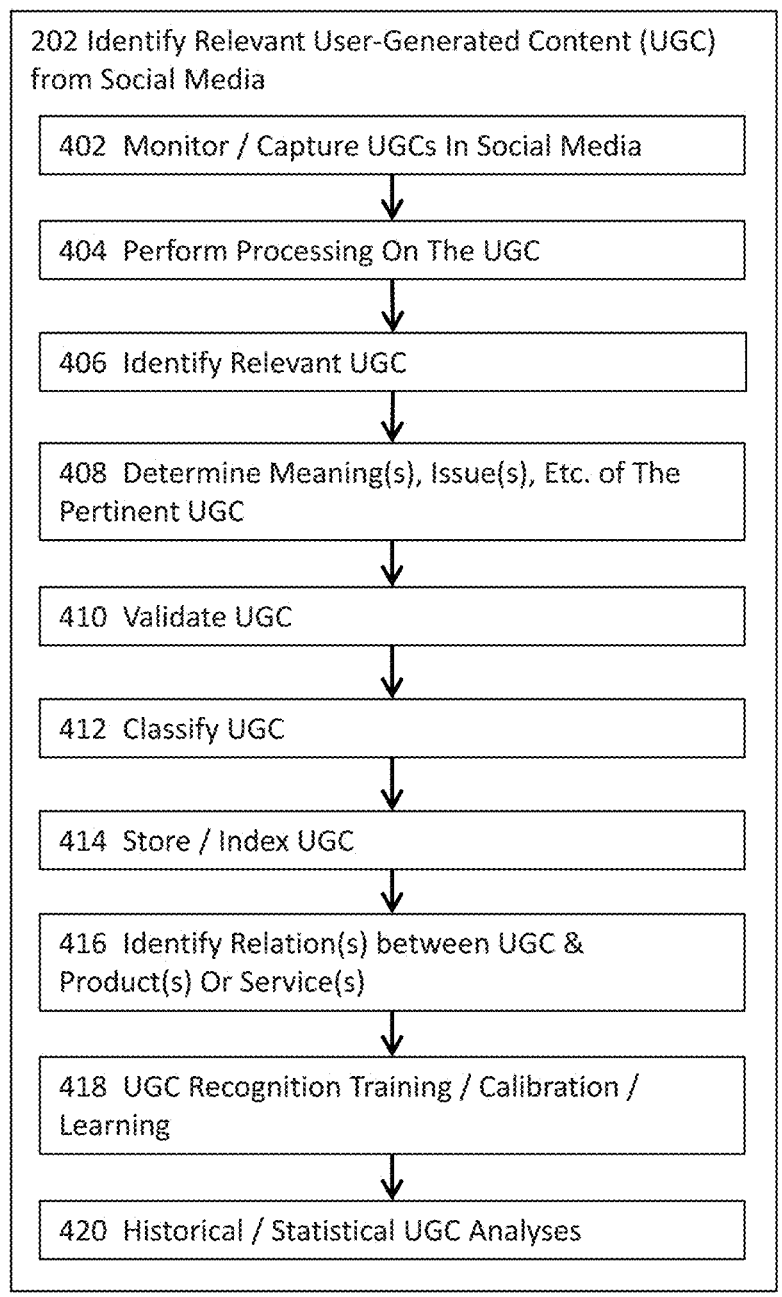
FIG. 4 illustrates more details for a part of the top level flow diagram illustrated in FIG. 2 in some embodiments.

FIG. 4 illustrates more details for a part of the top level flow diagram illustrated in FIG. 2 in some embodiments. More specifically, FIG. 4 illustrates more details about the process or module 202 for identifying a relevant user generated content item in a social media network in some embodiments. In these embodiments, the process or module 202 may comprise the respective process or module 402 for monitoring or capturing user generated content items in one or more social media networks.

For example, process or module 402 may monitor the user posts or other types of user generated content items in a user forum hosted by a server of a company that also provides, for example, one or more products or services 108. As another example, process or module 402 may also monitor user posts or other user generated content items in a social media network hosted by a third party (e.g., Facebook®, Twitter®, etc.) Process or module 402 may capture some of the monitored user generated content items by, for example, storing such user generated content items or a portion of each user generated content item (e.g., a relevant portion or a portion of interest) in a storage device.

In some embodiments, the process or module 202 may further comprise the respective process or module 404 for performing one or more processes on the user generated content items. For example, process or module 404 may perform a filtering process on some captured user generated content items to determine whether such captured user generated content items are of interest for further processing. As described previously with reference to FIG. 2, process or module 202 may perform process or module 404 in some embodiments and may not necessarily perform process or module 404 in some other embodiments while going directly to, for example, process or module 408 for these monitored or captured user generated content items.

In some embodiments, the process or module 202 may further comprise the respective process or module 406 to identify one or more relevant user generated content items by further processing the user generated content items. Process or module 406 may process the user generated content items by using, for example, a parsing process, a natural language processing process, a natural language understanding process, a data mining process, a data dredging process, a knowledge engineering process, a profiling process, or any combinations thereof in some embodiments. For example, the process or module 406 may perform natural language processing on the user generated content items to determine the meanings or issues of the one or more relevant user generated content items at 408.

In some embodiments, the process or module 202 may further comprise the respective process or module 410 to validate the relevant user generated content items. In some embodiments, process or module 410 may validate the processing results, meanings, or issues, etc. by using assisted or unassisted machine learning processes. In some of these embodiments where assisted machine learning processes are used, process or module 410 may forward the processing results generated at 406 or the meanings or issues determined at 410 to a human being or a human expert for review and validation of the processing results, meanings, or issues, etc. The validation results may be transmitted back to the machine learning processes or modules or other processes or modules (e.g., the natural language processing modules) to calibrate or adjust the parameters, algorithms, etc. of these processes or modules to improve their accuracy such that such processes or modules may be used in a completely automatic manner once the confidence level or the accuracy level has been confirmed to reach a certain level.

In addition or in the alternative, process or module 202 may comprise the respective process or module 412 to classify relevant user generated content items by using, for example but not limited to, a Bayesian classification process or module, to classify relevant user generated content items to one or more categories. In some embodiments, the Bayesian classification process or module (or the Bayesian classifier) includes a Naïve Bayes classification process or module (e.g., a tf-idf or term frequency-inverse document frequency Naïve Bayes classification algorithm), support vector machines, and a syntactic natural language processor. In these embodiments, the syntactic natural language processor may work in conjunction with one or more grammatical structures identified from a user generated content item to determine, for example but not limited to, relevance scoring, or scoring. In some embodiments, the method or system may use different processes or modules for different kinds of user generated content items. For example, the method or system may use the Naïve Bayes classification process or module and/or the support vector machines for tweets that are generally short (e.g., limited to 140 characters per tweet) and the Bayesian classifier with the syntactic natural language processor for, for example, blogs or Facebook posts which usually have some proper grammatical structures. Process or module 202 may include the respective process or module 414 of storing the relevant user generated content items, a portion thereof (e.g., the relevant portion or the portion of interest of one or more of these user generated content items, etc.) in a non-transitory, volatile or non-volatile computer readable medium in some embodiments. In some of these embodiments, process or module 414 may further index the stored user generated content items to improves access to, retrieval of, or operation on the stored user generated content items.

Process or module 202 may identify one or more relations between a user generated content item and one or more products or services offered by a company at 416 based at least in part upon the processing results generated at 406 or the meanings or issues determined at 408. For example, if process or module 406 or 408 identifies that a particular tweet in a social media network includes tax return issues, process or module 416 may correlate the particular tween with a tax return preparation product or service. Process or module 202 may, in addition or in the alternative, perform training, calibration, or learning processes on the user generated content items at 418 in some embodiments.

For example, process or module 418 may use the validation results generated at 410 through human expert review to examine various processing results (e.g., the results generated at 404, 406, or 408) to improve the accuracy or confidence level of the processes or processing modules of 404, 406, or 408 in some embodiments. The process or module 202 may also optionally perform one or more historical or statistical analyses in some embodiments to determine, for example, whether the overall method or system with the post-training, calibration, or learning processes or modules produce better or more accurate results, in light of the validation results generated at 410.

Figure 5:
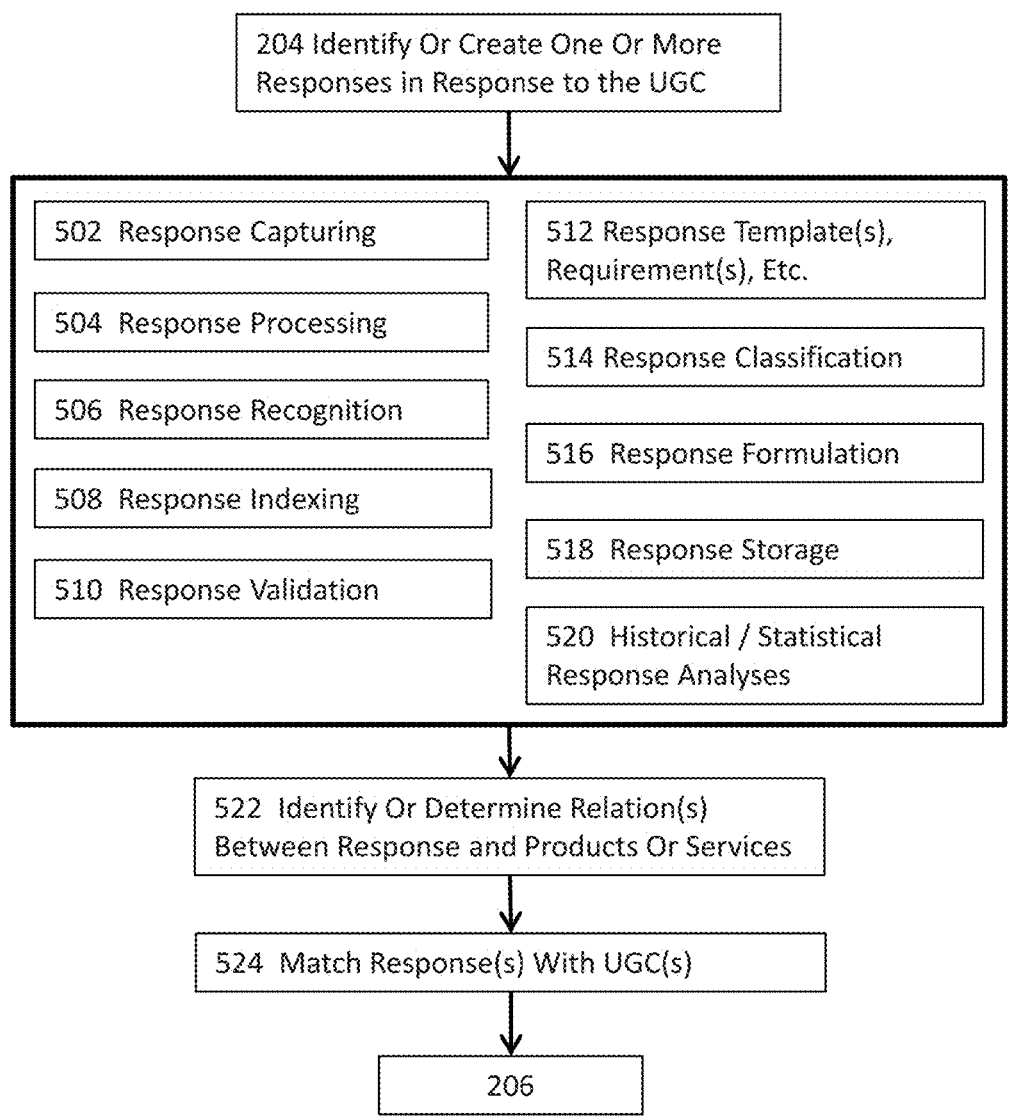
FIG. 5 illustrates more details for a part of the top level flow diagram illustrated in FIG. 2 in some embodiments.

FIG. 5 illustrates more details for a part of the top level flow diagram illustrated in FIG. 2 in some embodiments. More specifically, FIG. 5 illustrates more details about process or module 204 of FIG. 2. In some embodiments, the process or module 204 to identify or create one or more user generated content items in a social media network comprises a response capturing process or module 502 to capture the user generated content items from one or more social media networks. Process or module 204 may comprise a response processing process or module 504 to process a response in substantially similar manners as those described for 404 for some responses previously generated with non-electronic means such as a hand written response.

Process or module 204 may include a response recognition process or module 506 in substantially similar manners as those described for 406 of FIG. 4. Process or module 204 may index stored responses at 508 by using, for example, any known database indexing techniques to facilitate the access to, retrieval of, or operations on stored responses. For example, process 204 may index stored responses at 508 using the related products, services, issues, or meanings as indices such that a response of interest may be retrieved in an efficient manner for future relevant user generated content items. Process or module 204 may include a response validation process or module 510 to validate certain previously generated responses to, for example, these previously generated responses may still be used at current time.

For example, the validation process or module 510 may validate a previously generated response to ensure that the previously generated response conforms to the current tax code such that the response may still be used in response to a user generated content item including tax related issues. Process or module 204 may include one or more response templates, one or more presentation requirements, etc. (512) for various social media networks such that the response module 114 may use a response template to prepare a response that complies with the requirements of a particular social media network in some embodiments. Process or module 204 may include a response classification process or module 514 to classify stored responses (518) into one or more categories that correspond to the one or more categories of stored user generated content items. Responses may be stored in a non-transitory computer readable medium in various forms such as a data structure, a database, a table, etc.

Process or module 204 may optionally include a response formulation process or module 516 to prepare a response either by using the process or module 516 itself or in conjunction with other processes or modules described herein. Process or module 204 may include a historical or statistical response analysis process or module 520 to perform one or more historical or statistical analyses on stored responses to determine, for example, the effectiveness or helpfulness of one or more stored responses. At 522, process or module 204 may, in addition or in the alternative, identify or determine one or more relations between a response and one or more products or services offered by a company. For example, process or module 522 may identify or determine that a particular response is related with an online tax return preparation product and a personal finance management product offered by the company that also provides one or more servers hosting various processes or modules described herein. Process 204 may match one or more responses with one or more user generated content items by using, for example, various processing techniques (e.g., natural language processing technique), database query, indexing, or the determined relations with one or more products or services.

Figure 6:
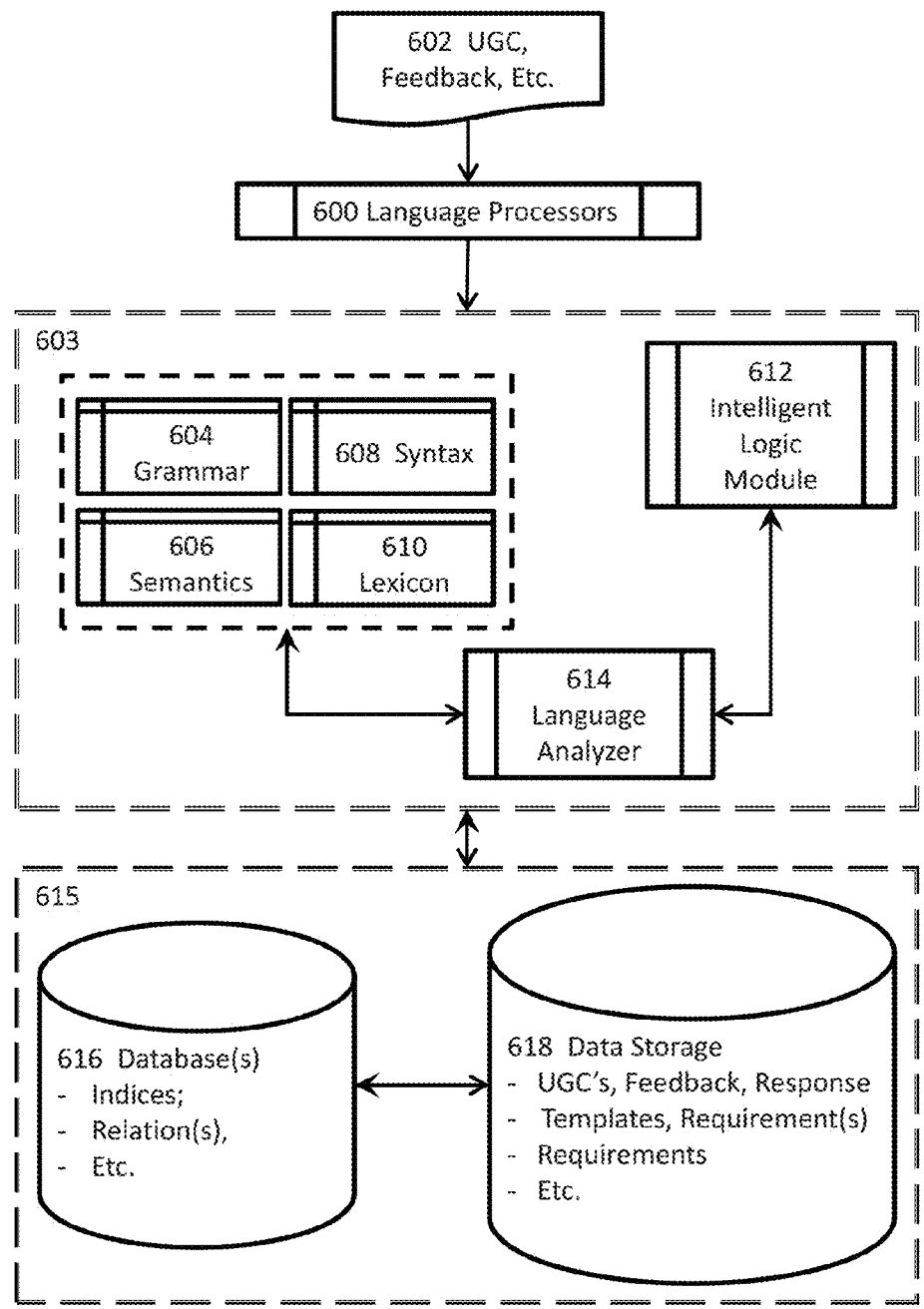
FIG. 6 illustrates a flow diagram for analyzing social media with trained intelligent systems to enhance direct marketing opportunities in some embodiments.

FIG. 6 illustrates a flow diagram for analyzing social media with trained intelligent systems to enhance direct marketing opportunities in some embodiments. More specifically, FIG. 6 illustrates an exemplary process for performing or modules to perform the action 202, 304, 306, 406, or 408 described in the preceding paragraphs with reference to FIGS. 2-4. In one or more embodiments, the exemplary process or module comprises the language processors 600 that may include a parser, compiler, or interpreter (hereinafter parser) and a capturer, which receives or identifies various user generated content items, responses, user feedback, etc. 602 that have been identified or received in, for example the one or more computing systems 102 of FIG. 1. The language processors 600 interact with, read from, or write to a backend analyzer 603 and a storage module 615 in some embodiments.

The backend analyzer 603 comprises the grammar module 604, the semantics module 606, the syntax module 608, and/or the lexicon module 610 in some embodiments. The backend analyzer 603 may further comprise the language analyzer 614 that interacts with the grammar module 604, the semantics module 606, the syntax module 608, and/or the lexicon module 610 to analyze the content of the identified or received user generated content items 602.

In one or more embodiments, the backend analyzer 603 may parse through the user generated content items 602 to retrieve information of interest or to discard or remove irrelevant, non-interested, or objective portions. The grammar module 604 may comprise grammar such as, but not limited to, dependency grammar, lexical functional grammar, categorical grammar, link grammar for human language or natural language processing, etc., to the language processors 600 for the language processors 600 to parse through and to help understand the content of a particular user generated content item 602.

The semantics module 606 provides semantic information or meanings of vocabularies or expressions to help the language processors 600 to describe the content of the user generated content items 602 in a meaningful manner in some embodiments. The semantic module 606 may comprise, for example, the generative or interpretative semantics to help explain, for example but not limited to, synonymy or transformation of the vocabularies or expressions of the identified or received user generated content items 602 in some embodiments.

The syntax module 608 provides the language processors 600 with one or more principles, rules, or syntaxes to help the language processors 600 to describe the content of a particular user generated content item 602 in some embodiments. The syntax module 608 may also interact with the grammar module 604 to describe the content of the user generated content items 602 according to the one or more rules or principles.

The lexicon module 610 with vocabulary support in some embodiments. The vocabulary support comprises a set of lexemes to support the language processors 600. For example, the lexicon module 610 provides a set of expressions and/or vocabularies and their respective linguistic morphology to support the language processors 600 such that the language processors 600 may understand the content of the identified or received user generated content items.

One or more of the grammar module 604, the semantics module 606, the syntax module 608, and the lexicon module 610 may interact with the language analyzer 614 to perform the grammatical analysis, the semantic analysis, the syntactical analysis, or the lexical analysis to help understand or describe the user generated content items 602 in a single embodiment or in some embodiments. The language analyzer 614 may further interact with an intelligent logic system 612 to further better help understand or describe the user generated content items 602 in some embodiments.

The intelligent logic system 612 may comprise, for example but not limited to, artificial intelligence module, an expert system, a knowledge engineering module, a fuzzy logic module, a supervised or unsupervised learning module or any other types of module with intelligence to improve the accuracy, reliability, or confidence level (collectively accuracy) of the understanding or description of the user generated content items 602. For example, the intelligent logic system 612 may provide additional capabilities to the language analyzer 614 to resolve ambiguities by using or implementing expert assessment of the conversations 602 and may further invoke, for example, a decision logic of an artificial intelligence module to determine whether the accuracy of the understanding or description of the user generated content items may be improved.

In some embodiments, the method or system adopts a neural network for the purpose of artificial intelligence. In some embodiments, the neural network refers to the artificial neural network or a simulated neural network which is composed of structurally or functionally interconnecting artificial nodes or programming constructs using a mathematical and/or a computational model for information processing by mimicking one or more properties of biological neurons based upon a connectionistic approach to computation without actually constructing the actual model of the system under investigation. It shall be noted that various terms such as neurons, neurodes, processing elements, or units may be used interchangeably with the term "structurally or functionally interconnecting artificial nodes" or "programming constructs". In various embodiments, the artificial neural network comprises an adaptive system which changes its structure based upon external and/or internal information that goes through the artificial neural network.

Artificial intelligence training on the artificial intelligence system or the artificial neural network may be performed to find, fine tune, adjust, or modify one or more relationships or correlations between, for example, the available information or data and the language analyzer 614 or between the determined understanding or description and the content of the user generated content items 602. Once the training of the artificial intelligence process or module is complete, the method or the system may then utilize the artificial intelligence module for the understanding, description, or analysis of the identified or received user generated content items.

One example of a suitable storage module 615 comprises one or more databases 616 and a data storage portion 618, which may persistently store thereupon, for example but not limited to, user generated content items, information, data, or statistics related to the users, information, data, or statistics related to the classification or categorization of a plurality of user generated content items, various presentation templates or requirements of social media networks, various static or dynamic libraries, dictionaries, or data structures for various processes or modules described herein, user feedback, relations between responses and one or more products or services, relations between a user generated content item and one or more products or services, various indices of the stored responses, feedback, or user generated content items, etc.

The system may also comprise or interact with one or more forms of temporary storage such as some random access memory to temporarily store various data, variable or parameter values, objects, or other information required or need for the execution of various processes or modules described herein or processes or modules required or needed to support the execution of various processes or modules described herein. The one or more databases or data structures 616 and the data storage 618 may be implemented in separate storage units such as any volatile or non-volatile computer readable, non-transitory storage media. In some embodiments, the one or more databases 616 and the data storage 618 may be implemented in a single storage unit.

Figure 7:
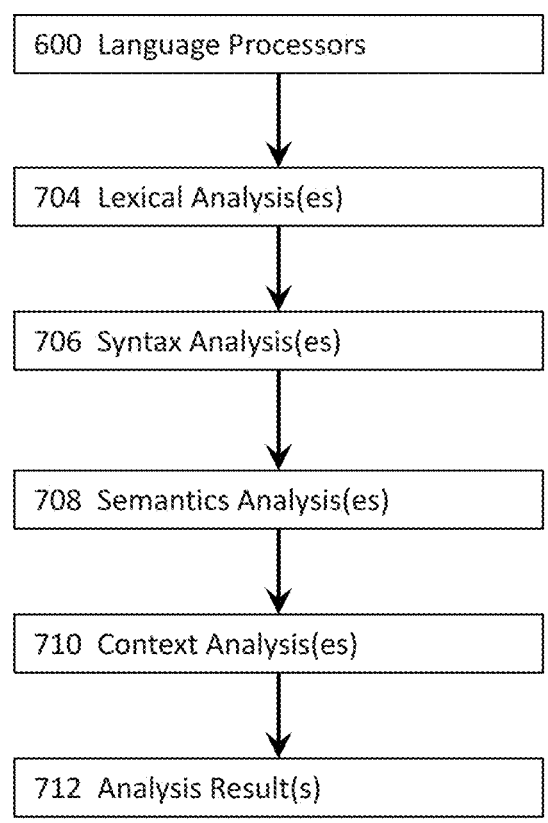
FIG. 7 illustrates more details for a part of the top level flow diagram illustrated in FIGS. 3-4 in some embodiments.

FIG. 7 illustrates more details for a part of the process illustrated in FIG. 6 in some embodiments. More specifically, FIG. 7 illustrates more details of the language processors 600 of FIG. 6 which may comprise the lexicon analysis process or module 704, which performs a lexing or scanning process to break up the content of the user generated content items identified or received at, for example, the one or more computing systems 102 in FIG. 1, into small tokens or units of the language. The units of language may be, for example, keywords, identifiers, or symbols such that the content of the user generated content items may be recognized. The language processor 600 may further comprise the syntax analysis process or module 706 which processes the results of the lexical analysis process or module 704 to identify the syntactic structure of the user generated content items so as to build a parsing result such as, but not limited to, a parse tree which represents the syntactic structure according to some grammar(s).

The language processors 600 may further comprise the semantics analysis module or process 708 by using, for example, the language analyzer process or module 614 based at least in part on the information from one or more processes or modules 604, 606, 608, and 610 to add semantic information to the result(s) of the syntactic analysis module or process 706 in some embodiments. The semantic analysis process or module 708 may further comprise the process or module for performing static or dynamic semantic checks for type errors.

The language processors 600 may also comprise the context analysis process or module 710 to analyze the context in which certain tokens or units are used so as to further ascertain or correct the results of various results of the lexical analysis process or module 704, the syntax analysis process or module 706, the semantics analysis process or module 708. For example, the context analysis process or module 710 may determine the meaning of a particular word or a particular symbol based on the preceding and/or the subsequent words, symbols, or expressions. For example, an exclamation mark "!" has different meaning depending on the context in which the exclamation mark is used. In a literal construction, the exclamation mark may indicate a sharp or sudden utterance expressive of strong feeling of the user. On the other hand, the exclamation mark in a relational operator means "not equal to" when the exclamation mark is followed by "=".

At 712, the language processors 600 may comprise the process or module of building the parsing result(s) in the single embodiment or in some embodiments. The parsing result may comprise, for example but not limited to, a parse tree or a linguistic parse tree which may be further used for additional processing.

Figure 8:
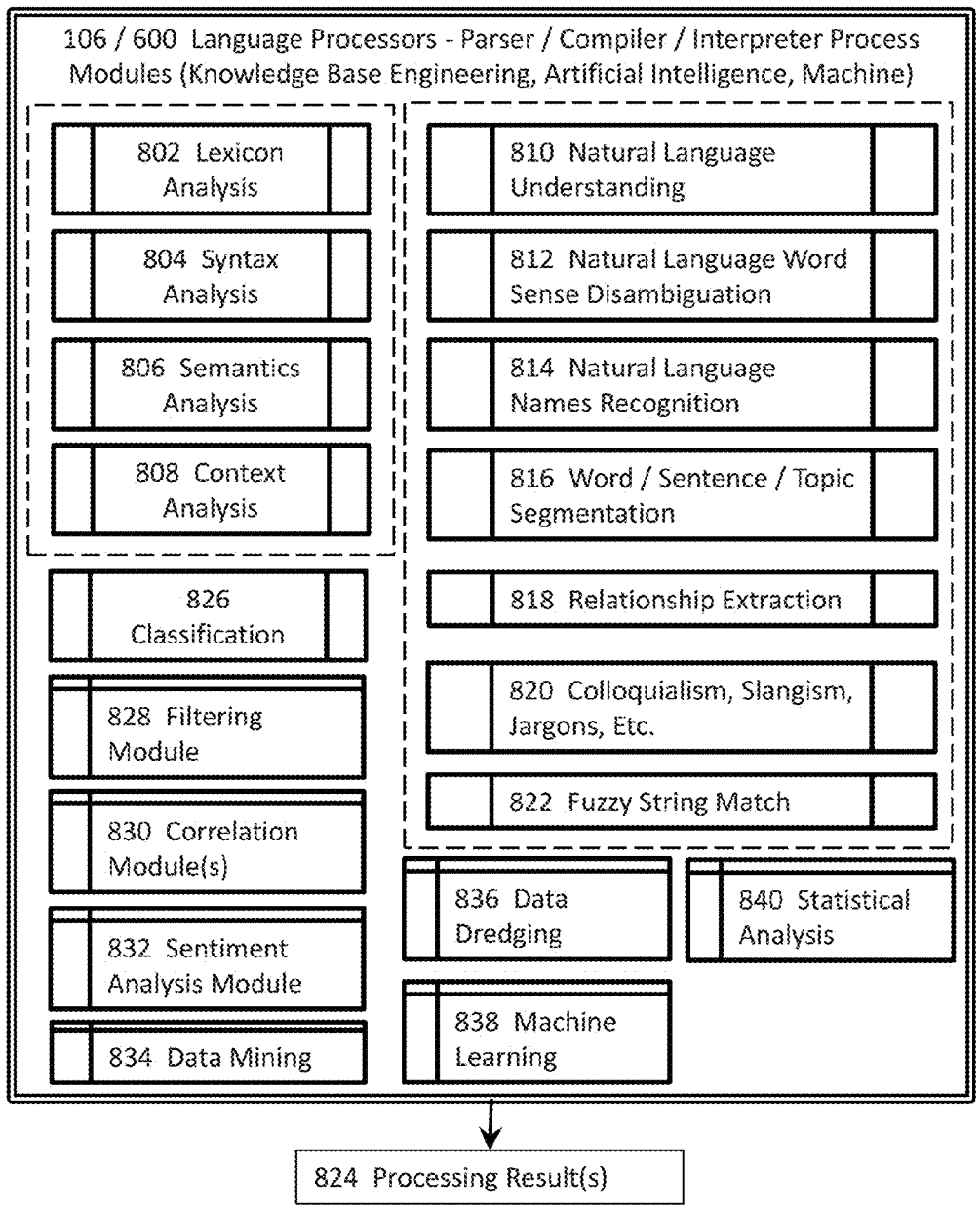
FIG. 8 illustrates more details for a part of the top level flow diagram illustrated in FIGS. 1 and 6 in some embodiments.

FIG. 8 illustrates more details for a part of the process illustrated in FIG. 1 or 6 in some embodiments. More specifically, FIG. 8 illustrates more details about the language processors 106 of FIG. 1 or 600 of FIG. 6 in some embodiments. As described with reference to FIG. 7, the language processors 106 or 600 may comprise the respective lexicon analysis process or module 802, the respective syntax analysis process or module 804, the respective semantics analysis process or module 806, or the respective context analysis process or module 808 in some embodiments. In some embodiments, the language processors 106 or 600 may comprise the respective process for performing or module to perform natural language processing.

In some embodiments, the process or module for natural language processing comprises a respective artificial intelligence process or module to perform natural language understanding 810 that enables a computing system, such as the one or more computing systems 102 of FIG. 1, to comprehend the user generated content items by determining the language used in the user generated content items, the lexicon of the language, and grammar rules for the user generated content items, and further by applying appropriate syntactic, semantic schemes, or logical inference to the user generated content items. In some embodiments, the process or module for natural language processing comprises a respective artificial intelligence process or module 812 to perform natural language word sense disambiguation to select the appropriate meaning that makes the most sense for a word that has more than one meaning.

In some embodiments, the natural language word sense disambiguation may also cooperate with the relation extraction (818) and a data dictionary or other electronic sources to determine the appropriate meaning for such a word. In some embodiments, the process or module for natural language processing comprises a respective artificial intelligence process or module 814 to perform natural language names recognition to determine whether a string of text or symbols in a user generated content item may be mapped to a proper name, such as the name of a company, an item, etc. In some embodiments, the process or module for natural language processing comprises a respective artificial intelligence process or module 816 to perform word, sentence, or topic segmentation to separate a set of text into segments of words, sentences, or topics by using techniques such as morphology.

In some embodiments, the process or module for natural language processing comprises a respective artificial intelligence process or module 818 to perform relationship extraction to identify one or more fine-grained or coarse-grained relationships from a string of text or objects in a user generated content item by detecting and classifying the semantic relationship mentions with domain ontologies or other electronic sources. In some embodiments, the process or module may output the results of relationship extraction in the RDF (Resource Description Framework) format.

In some embodiments, the process or module for natural language processing comprises a respective artificial intelligence process or module 820 to consult one or more data structures, one or more databases, one or more dictionaries, or any combinations thereof to determine the meaning of certain terms used in a user generated content item to accommodate colloquialisms, slangisms, or jargons.

In some embodiments, a colloquialism comprises a phrase or a lexical item that is common in conversations, rather than a formal speech, academic writing, or paralinguistics. A jargon may comprise a terminology that is defined in relationship to a specific activity, group, or profession, or geographical area and may be used to express ideas that are frequently used among members of the specific activity, group, or profession, or geographical area. A slang comprises In some embodiments, the process or module for natural language processing comprises a respective artificial intelligence process or module 822 to perform fuzzy string or approximate string search or match to find one or more strings in a user generated content item that approximately, rather than exactly, match a pattern that has already been recognized by the computing system, such as the one or more computing systems 102 of FIG. 1, by using techniques such as, but not limited to dynamic programming or the Levenshtein distance computing algorithm to find the smallest distance between each of the one or more strings and a recognized pattern.

The language processors 106 or 600 may include one or more of a classification process or module 826 to classify user generated content items into one or more categories or classes, a filtering process or module 828 to extract relevant information or to discard irrelevant or objective information in user generated content items, one or more correlation processes or modules 830 to correlate a user generated content item, a response to a user generated content item, a user feedback, or any other related pieces of information to, for example, one or more products or services offered by a company that hosts or remotely invokes various processes or modules described herein on one or more computing systems in one or more tiers.

The language processors 106 or 600 may, in addition or in the alternative, include one or more of a sentiment analysis module 832 to analyze the user's sentiment, opinions, emotions, feedback to responses, etc. (hereinafter sentiment collectively), a data mining process or module 834 to discover patterns or information of interest from large sets of data, a data dredging process or module 836 to uncover useful or misleading relationships in data or information in user generated content items, an assisted or unassisted machining learning process or module 838 to improve the accuracy of various processes or modules described herein, and a statistical analysis process or module 840 to analyze various historical data or information related to user generated content items, responses to user generated content items, user feedback, or various analysis results in some embodiments. The language processors 106 or 600 may then generate the parsing result(s) at 824.

Figure 9:
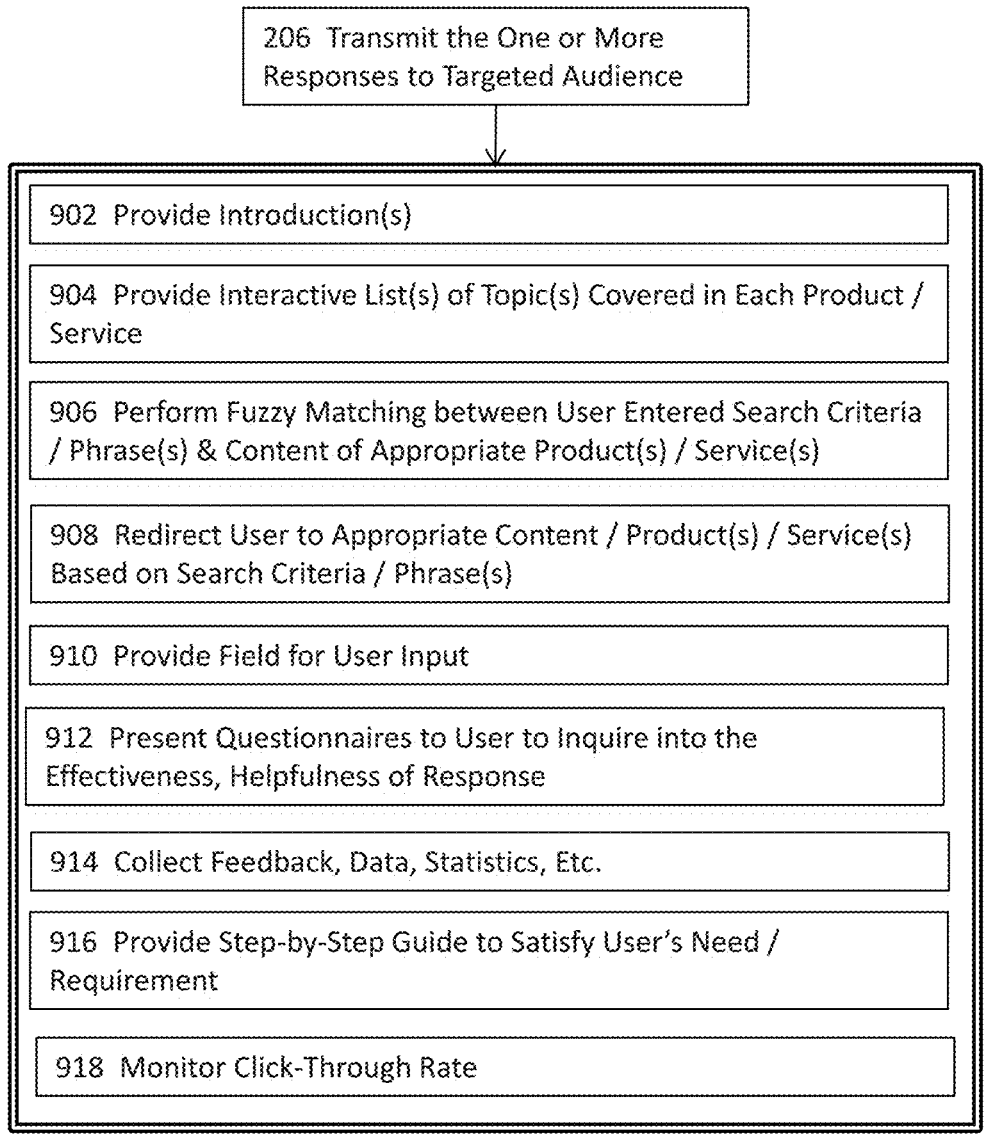
FIG. 9 illustrates more details for a part of the top level flow diagram illustrated in FIG. 2 in some embodiments.

FIG. 9 illustrates more details for a part of the top level flow diagram illustrated in FIG. 2 in some embodiments. More specifically, FIG. 9 illustrates more details about the process or module 206 of FIG. 2 and what a response may include in some embodiments.

In some embodiments, the process 206 may comprise the process 902 of providing visual, audio, textual (VAT) introduction(s), or a combination thereof as a part of a response to a user generated content item. In some embodiments, the process 206 may comprise the process 904 of providing one or more interactive lists of topics that are provided in a response such that the user receiving the response may select one or more topics of interest to follow or to repeat one or more topics to enhance the effectiveness or helpfulness of the response. In some embodiments, a response may provide a search field for a user to search within the response or from external sources (e.g., various Internet websites), and the process 206 in these embodiments may comprise the process 906 of performing fuzzy matching between the a search criterion (or criteria) or one or more phrases entered by a user to identify the matching content in the response received by the user or in other one or more sources that provide matching content in response to the one or more search criteria, one or more search phrases, or user entered natural language search during a user's review of a response.

In some embodiments, the process or module 606 for performing fuzzy string or approximate string search or match may work in conjunction with one or more other processes or modules to find one or more text strings in the one or more search criteria or one or more search phrases that approximately, rather than exactly, match a pattern that has already been recognized by the computing system(s), such as the one or more computing systems 102 of FIG. 1, by using techniques such as, but not limited to dynamic programming or the Levenshtein distance computing algorithm to find the smallest distance between each of the one or more text strings and a recognized pattern.

For example, a user may wish to inquire further into a specific aspect during the user's review of the response by entering or inputting one or more search criteria or one or more search phrases, the process 906 may invoke various processes or modules to interpret what the user wishes to know in the user's search criteria or search phrases and leverage, for example, the knowledge base engineering or some artificial intelligence processes or modules with assisted or unassisted machine learning to identify and provide one or more other types of content (e.g., audio content, video content, graphic content, textual content, or a combination thereof) to the user to satisfy the user's inquiry.

In some embodiments, the process 206 may comprise the process 908 of redirecting a user to appropriate content, product(s), or service(s) based at least in part upon the one or more search criteria or one or more search phrases entered by the user. For example, if a user enters the phrase "head of house" in the search field, process or module 206 may redirect the user to the appropriate content that explains or defines the qualifications for a "head of household" in the same user interface or in another user interface. In some embodiments, the process 206 may comprise the process 910 of providing an field to accept user input such as one or more search criteria or one or more search phrases. Process or module 910 may then pass the user input together with some identification of the response back to the computing system (e.g., the one or more computing systems 102 of FIG. 1) to determine whether the user has encountered difficulties and may in addition or in the alternative provide one or more hints, additional topic(s), content, or additional response(s) to further assist the user.

In some embodiments, the process 206 may comprise the process 912 of presenting a questionnaire to the user either as a part of the response or in a separate communication to inquire the effectiveness or helpfulness of the response that has been transmitted to the user in response to the user generated content item. Process 206 may also include the process 914 of collecting user's feedback, or other data or statistics that may be forwarded to various analysis modules or processes for further evaluation or analyses.

In some embodiments, the process 206 may comprise the process 916 of providing a step-by-step guide, a trial version of one or more products or services including an option and information to purchase but having a limited set of capabilities (e.g., a reduced set of functionality, limited capability to save work product generated by these one or more products or services, limited availability of the one or more products or services within a limited period of time or within a limited number of launches, etc.), an option to request for live support by sales or support personnel, etc. in the form of links to external resources external to a response, audio, video, graphic, textual, or a combination thereof to the user to further assist the user. For example, process 916 may provide a step-by-step guide to the user to help the user complete IRS Form 1040 either as a part of the response or in a separate linked resource. In some embodiments, the process 916 may provide the "show me" functionality (e.g., by providing a "show me" button in the step-by-step guide) to take over from the user and to show the user how a specific take or step is to be performed properly.

In some embodiments, the process 206 may comprise the process 918 of monitoring various metrics of the response. The various metrics may include, for example but not limited to, whether the user clicks through the response, how much time the user took to complete reading or clicking through the response, the amount of time used for the step-by-step guide or any individual step thereof, the number of occurrences a user has sought help or reviewed other supplemental materials or content during the user's review of a response or at a specific step or task linked to the response, etc. The monitored metrics for a specific response may be used for statistical analyses for quality assurance or enhancement purposes in some embodiments.

Figure 10:
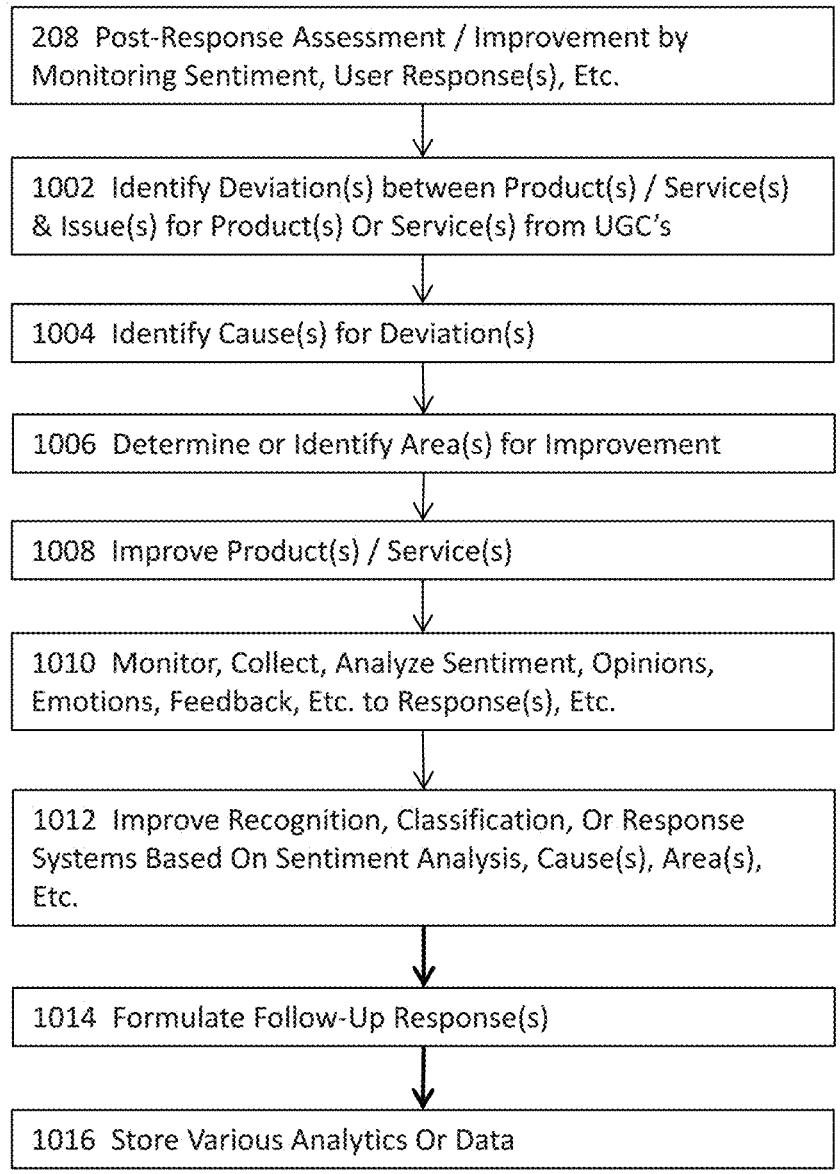
FIG. 10 illustrates more details for a part of the top level flow diagram illustrated in FIG. 2 in some embodiments.

FIG. 10 illustrates more details for a part of the top level flow diagram illustrated in FIG. 2 in some embodiments. More specifically, FIG. 10 illustrates more details about the process or module 208 of FIG. 2. In some embodiments, process or module 208 may include the respective process or module 1002 for identifying one or more deviations between the issues or meanings of a user generated content item and one or more products or services and the respective process or module 1004 of identifying causes for such one or more deviations.

For example, upon identifying and analyzing a relevant user generated content item, process or module 1002 may identify that a user has a need for or an issue with a personal financial management product or service that a company offers, and that a possible cause for such a need or issue is that the documentation or advertisement of the personal financial management product or service offered by the company may not be prepared or presented in such a manner to draw the attention of the user. Various processes or modules (e.g., process or module 202, 204, and 206) may thus identify or create a response and transmit such a response to the user for direct marketing purposes.

Process or module 208 may then optionally identify one or more areas for improvement at 1006 and optionally improve one or more products or services offered by the company at 1008. In the above example, process or module 208 may modify or cause to modify the documentation or advertisement of the offered personal financial management product or service such that other similarly situated users may become aware of the company's offering of the product or service. Process or module 208 may include the respective process or module 1010 of monitoring, collecting, or analyzing user sentiment, opinions, emotions, or user's feedback to one or more responses, etc. in some embodiments. More details about the process or module 1010 will be described in subsequent paragraphs with reference to FIG. 11.

Process or module 208 may improve the recognition of various user generated content items, user feedback, correlations user generated content items or user feedback and one or more products or services, effectiveness or helpfulness of responses based at least in part upon the causes for deviations, areas for improvement, or sentiment analysis results, etc. at 1012. In some embodiments, process or module 208 may improve the accuracy of language processors (e.g., various recognition processes or modules, various understanding processes or modules, etc.), one or more analysis or evaluation processes or modules, or the response process(es) or module(s) (e.g., the response process or module 114), etc. at 1012 to further improve the sentiment analyses, the causes, or the area(s) of improvement, etc. based at least in part upon the results of process or module 1010.

With or without the improvement achieved by process or module 1012, process or module 208 may formulate and transmit one or more follow-up responses to the user at 1014. For example, a user who has received a first response may provide some user feedback, and process or module 1014 may thus provide a follow-up response to the user based on the processing and understanding of the user's feedback. In this example, if the user's feedback indicates that the first response does not resolve the user's issues, various processing modules (e.g., the natural language processes or modules or the response process or module) may be adjusted or calibrated in an assisted machine learning process based at least in part on a human expert review of the user's feedback in order to provide a more accurate response as a follow-up response.

In addition or in the alternative, process or module 208 may formulate or prepare one or more follow-up responses at 1014 by using, for example, the response module 114 of FIG. 1 or a response by a human expert, based at least in part upon the improvement at 1012. Process or module 1014 may then transmit the one or more follow-up responses to the user in response to, for example, the user's feedback in some embodiments. In the event that the user further responds to the one or more follow-up responses, process or module 208 may repeat some or all of the processes or modules described herein for FIG. 10 to further determine, for example, whether there is still room for improvement or another follow-up response in some embodiments.

In some embodiments, such an assisted machine learning process or module may be implemented internally within a company offering one or more products or services such that the less helpful or effective responses will not injure the goodwill or branding of the company. Process or module 208 may store various analytics, data, information, or statistics generated or collected by any of the processes or modules described herein at 1016 in one or more non-transitory, volatile or non-volatile computer readable media in some embodiments.

Figure 11:
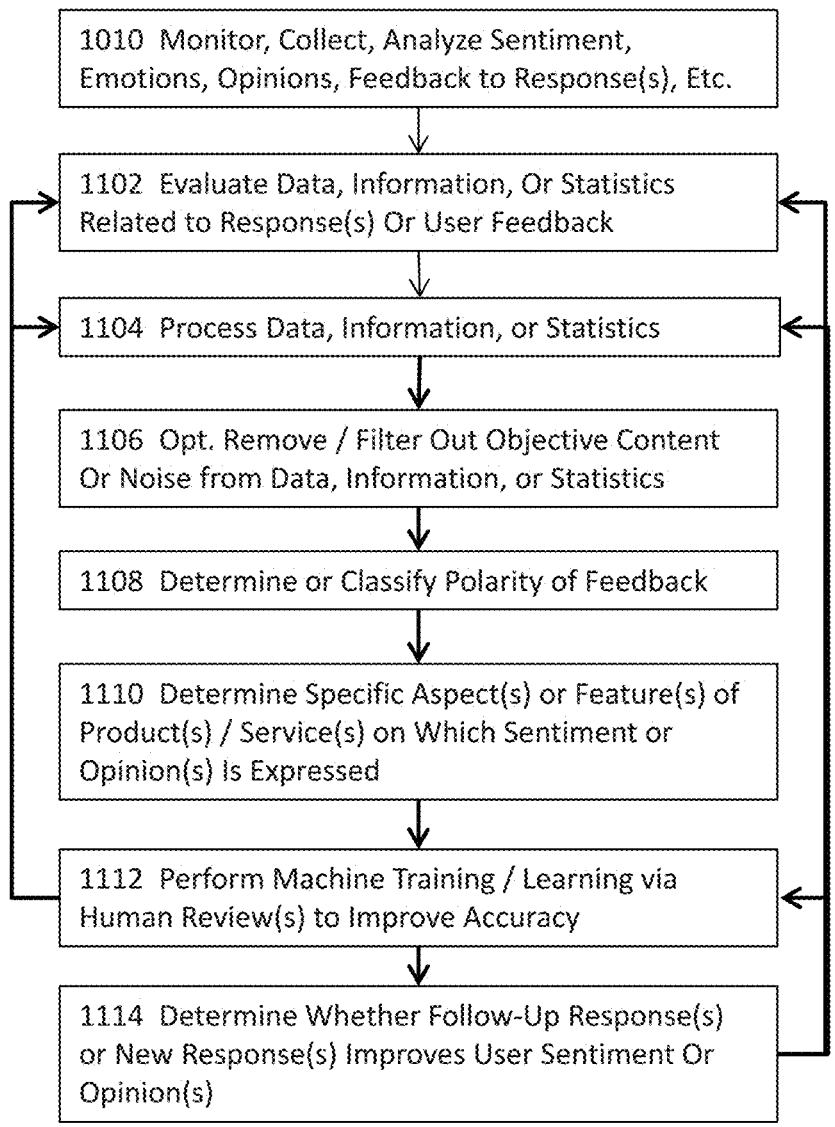
FIG. 11 illustrates more details for a part of the top level flow diagram illustrated in FIG. 10 in some embodiments.

FIG. 11 illustrates more details for a part of the top level flow diagram illustrated in FIG. 10 in some embodiments. More specifically, FIG. 11 illustrates more details about an exemplary sentiment analysis 1010 in some embodiments. In some embodiments, process or module 1010 may collect and evaluate data, information, or statistics related to one or more responses, user's feedback or other input (e.g., one or more search criteria, one or more search phrases, user entered natural language search during user's review of a response) in response to one or more responses, one or more user generated content items, etc. (collectively "user input" or "user's input") at 1102.

The data, information, or statistics may include, for example but not limited to, various analysis results of various analysis or evaluation modules or processes or logic therefor, various metrics such as those described for 918, information or data extracted from user's feedback, any correlation results or logic therefor, etc. and will be collectively referred as user's input Process or module 1010 may process user's input at 1104 by using, for example, the filtering processes or modules or the language processors 600 described herein in some embodiments. Process or module 1010 may collect and then evaluate or analyze the data, information, or statistics based at least in part upon one or contexts in which the data, information, or statistics appear at 1104 in some embodiments.

Process or module 1010 may also optionally remove or filter out a part of the user's feedback or other input, data, information, or statistics that are related to responses transmitted to users, users' feedback, or other input from users at 1106. In some embodiments, the method or system may further invoke the classification module to classify the user's feedback or other input, data, information, or statistics. In some embodiments, process or module 1010 removes or filters out the part of the user's feedback or other input, data, information, or statistics before such user's feedback or other input, data, information, or statistics are evaluated or classified.

For example, process or module 1010 may use, for example, the language processors 600 to identify and remove objective elements, such as some universally true statements or irrelevant elements, both of which are not useful in determining or assessing user's sentiment, from the data, information, or statistics in some embodiments. In some other embodiments, process or module 1010 may use the language processors 600 to identify and extract subjective elements or relevant elements, both of which are useful in determining or assessing user's sentiment, from the data, information, or statistics.

In some embodiments, process or module 1010 identifies and extracts the part of the user's feedback or other input, data, information, or statistics and evaluates or classifies such extracted part of the user's feedback or other input, data, information, or statistics. For example, process or module 1010 may identify elements that explicitly or implicitly express user's satisfaction or dissatisfaction about a specific response, user's comments on usefulness or effectiveness of a specific response, etc. and then evaluates such explicitly or implicitly expressed user's satisfaction or dissatisfaction about a specific response, user's comments on usefulness or effectiveness of a specific response, etc. in some embodiments.

In some embodiments, process or module 1010 may determine or classify the user's feedback or other input, data, information, or statistics at 1108. For example, process or module 1108 may determine or classify the polarity (e.g., positive, neutral, negative, happy, indifferent, angry, etc.) of the user's feedback or other input, data, information, or statistics. Process or module 1108 may, in addition or in the alternative, assign a symbolic or numeric rank or a numeric score of such user's feedback or other input, data, information, or statistics and may identify specific user's feedback or other input, data, information, or statistics for further processing or escalated attention if the symbolic or numeric rank is at or above a predetermined level.

For example, process or module 1108 may flag a user's negative sentiment and forward the associated data or information for further review or processing by, for example, a marketing professional, a customer relationship specialist, etc. As another example, process or module 1108 may also flag a user's positive sentiment, which has been determined to be at or above a certain level to forward the associated data or information (e.g., the user's contact information, sentiment analysis results, user's feedback, the original user generated content item, etc.) to one or more modules or processes (e.g., the response module 114) or to a human specialist (e.g., a sales representative, a live support personnel, etc.) to follow up with the user based on the user's positive sentiment determined by process or module 1108.

For example, upon the determination of a user's positive sentiment at or above a certain predetermined level, process or module 1008 may forward the associated data or information to the response module 114 to generate a follow-up response including the complete purchasing information, links, or a license key (e.g., a valid license key for a downloaded trial version of a product or service) to the user in order to completely resolve the user's issues or requests in the original user generated content item. In some cases, process or module 1108 may also forward the associated data or information to a responsible personnel (e.g., a sales representative or a support personnel) to follow up on the user's positive sentiment to further develop the business opportunity.

Process or module 1010 may, in addition or in the alternative, collect and evaluate or analyze the data, information, or statistics by further correlating or associating the evaluating results or the data, information, or statistics themselves with specific features or aspects of one or more products or services at 1110. For example, a negative comment from a user on a specific feature or aspect of a prior version of a product offered by a company may not necessarily reflect a negative sentiment of the user about the current version of the same product that does not include or improves upon the specific feature or aspect. On the other hand, the same negative comment that is not associated with specific versions of a product may nevertheless reflect the user's negative sentiment about the products or services at which a specific response is directed.

In some embodiments, process or module 1010 may include the respective process or module 1110 of determining one or more specific features or one or more specific aspects of one or more products or services offered by a company on which user sentiment or user opinions are expressed. At 1112, process 1010 may further improve the accuracy of the sentiment analysis process or module 1010 by using assisted or unassisted machine learning processes (1112) to improve the accuracy of the language processors (e.g., various recognition processes or modules, various understanding processes or modules, etc.), one or more analysis or evaluation processes or modules, or the response process(es) or module(s) (e.g., the response process or module 114), etc. such that the results of the sentiment analyses, the causes, or the area(s) of improvement, etc. may be further improved in some embodiments.

The process or module 1010 may return from 1112 back to 1102 for re-evaluation or to 1104 to re-process the user's input based on the improvement done by process or module 1112 based on the same set of user input in some embodiments or based on the same set of user input plus additional user's input in response to, for example one or more follow-up responses to the user's input or user's additional input in response to the one or more follow-up responses in some other embodiments. For example, process or module 1010 may forward the associated data or information to a human expert for review and further incorporate the review results of the human expert in the machine learning process or module 1112 to improve the accuracy of various processes or modules described here.

In some embodiments where one or more follow-up responses have been sent in response to the user's input or one or more new responses have been sent with various improved processes or modules (e.g., by process or module 1112), process or module 1010 may determine whether or not the one or more follow-up responses or the one or more new responses improve the user's sentiment or opinions at 1114. Process or module 1114 may also return to process or module 1102, 1104, or 1112 to iteratively improve the accuracy of the sentiment analysis process or module 1010.

Figure 12:
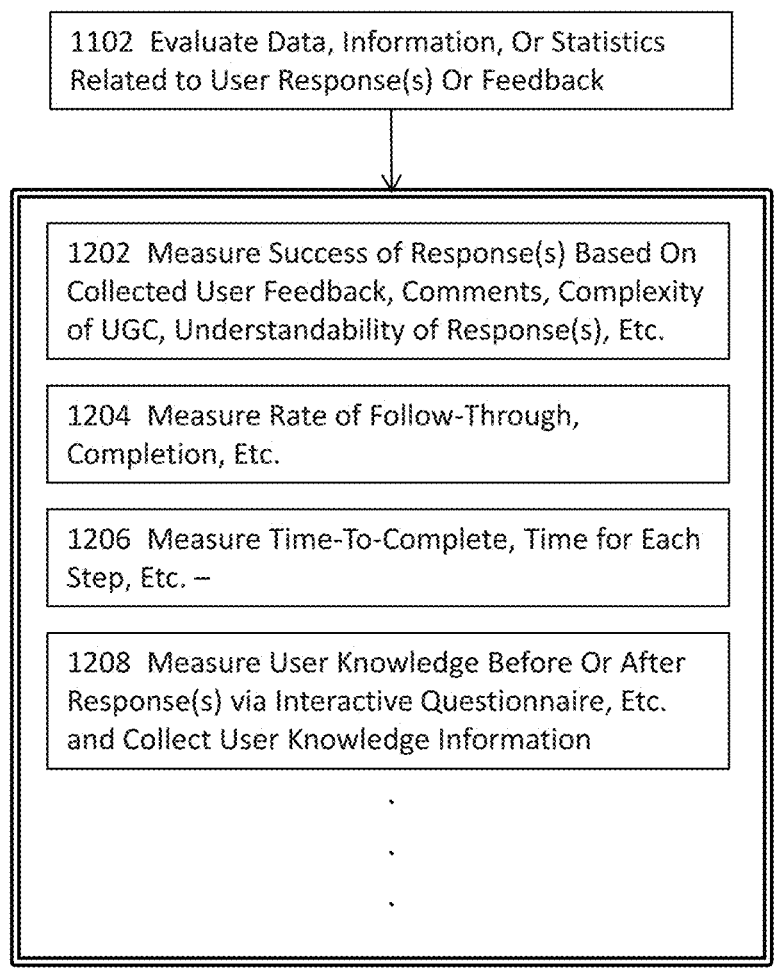
FIG. 12 illustrates more details for a part of the top level flow diagram illustrated in FIG. 11 in some embodiments.

FIG. 12 illustrates more details for a part of the top level flow diagram illustrated in FIG. 11 in some embodiments. More specifically, FIG. 12 illustrates more details about the process or module 1102 of FIG. 11. In some embodiments, process or module 1102 may measure the success, failure, effectiveness, or helpfulness of a response at 1202 based at least in part upon collected user's input, comments, feedback, complexity of the original user generated content item for which the response is generated, the understandability of the response for a lay person (e.g., whether the response includes a threshold amount of tax-related legal content), etc. In some embodiments, process or module 1202 may further assign quantifiable weights to different, dependent or independent factors and determine a composite index or indicator for measuring the success, failure, effectiveness, or helpfulness of a response.

For example, process or module 1202 may assign a numeric weight of five to user's input, a numeric weight of three to user's comments or feedback, a numeric weight of negative two to the original user that has high complexity and is generated content item for which the response is generated, a numeric weight of negative two to the response with low understandability for a lay person. As another example, process or module 1202 may also assign a numeric weight of (five+the respective weight of complexity) or a numeric weight of (five+the respective weight of understandability) to the user's feedback or comment to diminish the contribution of the user's input to the overall success, failure, helpfulness, or effectiveness of a response to incorporate the scenarios where a response with high complexity or low understandability may usually tile a user's input toward the negative side.

In some embodiments where the social media network is within the control of a company such that the company may monitor further details or user actions in the social media network (e.g., the social media network is hosted by the company), process or module 1102 may further measure the rate of following through or the rate of completion of reviewing the response by a user at 1204. In these embodiments, process or module 1102 may, in addition or in the alternative, measure the time-to-complete for the response or a portion thereof (e.g., a step-by-step guide in the response, the total time for review the response, or a total time for each step in a step-by-step guide, etc.)

At 1208, process or module 1102 may, upon agreement by the user, optionally measure the user's knowledge about specific areas related to the original user generated content item before or after transmitting the response created for the original user generated content item and collect the user's knowledge information. For example, process or module 1208 may first seek user's agreement to answer certain questions as the beginning part of a response to the user generated content item, presents a list of questions for the user to answer, and collect the user's answers to the list of questions to evaluate the user's level of knowledge before the user accesses the content of the response that directly addresses the user's issues or requests in the user generated content item.

Process or module 1208 may, in addition or in the alternative, seeks user's agreement to answer another list of questions, presents the another list of questions to the user upon receiving the user's approval, and collects the user's answers to the another list of questions to assess the user's knowledge after the user completes the review in some embodiments. In some embodiments where process or module 1208 obtains the user's knowledge level both before and after reviewing the response, process or module 1208 may further forward the assessed knowledge levels (both before and after reviewing the response) to, for example, process or module 1202 to evaluate the success, failure, effectiveness, or helpfulness of the response.

System Architecture Overview

Figure 13:
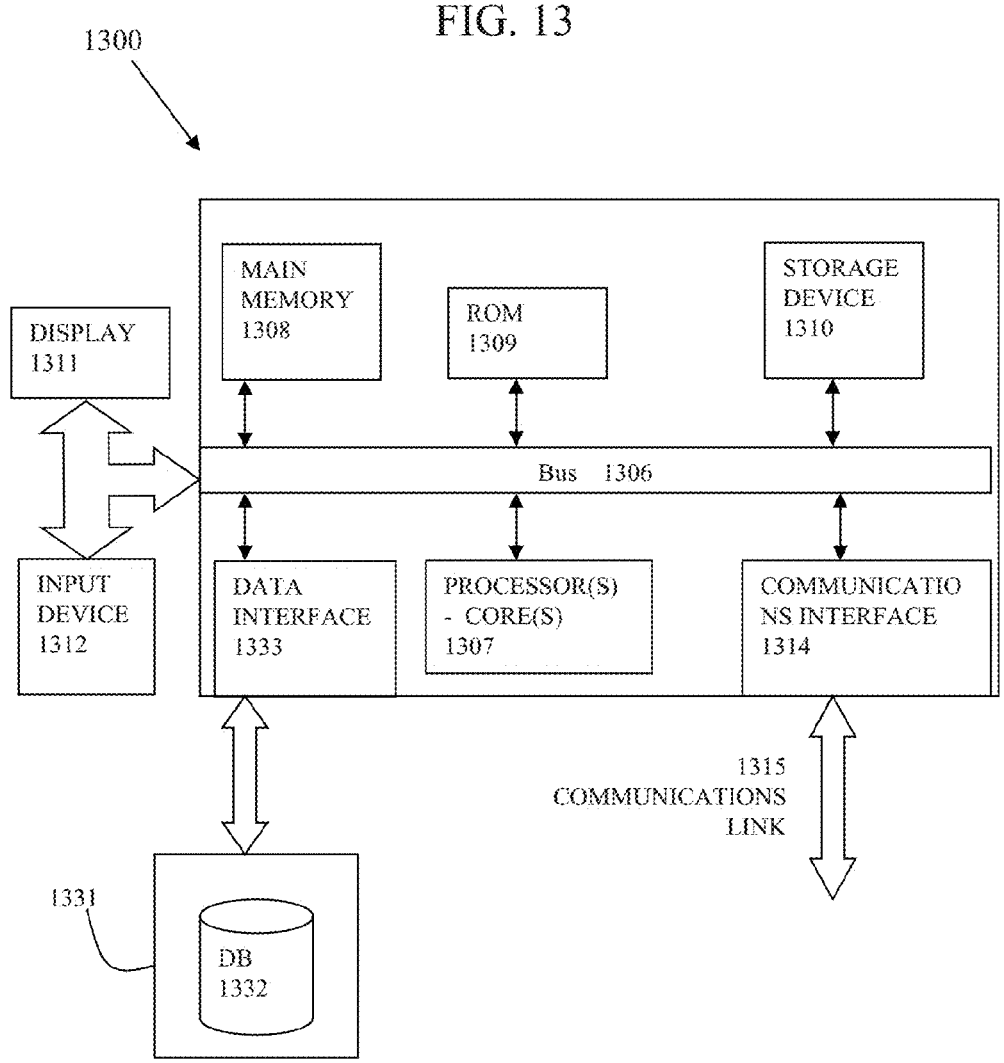
FIG. 13 illustrates a block diagram of an illustrative computing system 1400 suitable for implementing various embodiment of the invention.

FIG. 13 illustrates a block diagram of an illustrative computing system 1300 suitable for implementing various embodiment of the invention. For example, the exemplary computing system 1300 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 1300 includes a bus 1306 or other communication mechanism for communicating information, which interconnects subsystems and devices, such as processor 1307, system memory 1308 (e.g., RAM), static storage device 1309 (e.g., ROM), disk drive 1310 (e.g., magnetic or optical), communication interface 1313 (e.g., modem or Ethernet card), display 1311 (e.g., CRT or LCD), input device 1312 (e.g., keyboard), and cursor control (not shown).

According to one embodiment of the invention, computer system 1300 performs specific operations by one or more processors or processor cores 1307 executing one or more sequences of one or more instructions contained in system memory 1308. Such instructions may be read into system memory 1308 from another computer readable/usable storage medium, such as static storage device 1309 or disk drive 1310. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in some embodiments, the one or more processors or processor cores 1307 may be used to perform various actions such as various actions, processes, or modules involving determining, analyzing, performing actions, etc. In some embodiments, at least one of the one or more processors or processor cores 1307 has the multithreading capability.

In one embodiment, the term "logic" shall mean any combination of software or hardware that is used to implement all or part of the invention. In the single embodiment or in some embodiments, the one or more processors or processor cores 1307 may be used to perform various acts such as various acts involving determining, analyzing, performing actions, etc. In some embodiments, at least one of the one or more processors or processor cores 1307 has the multithreading capability to execute a plurality of threads to perform various tasks as described in the preceding sections.

Various actions as described in the preceding paragraphs may be performed by using one or more processors, one or more processor cores, or combination thereof 1307. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 1307 for execution. Such a medium may take many forms, including but not limited to, non-volatile media and volatile media. Non-volatile media includes, for example, optical or magnetic disks, such as disk drive 1310. Volatile media includes dynamic memory, such as system memory 1308.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 1300. According to other embodiments of the invention, two or more computer systems 1300 coupled by communication link 1315 (e.g., LAN, PTSN, or wireless network) may perform the sequence of instructions required to practice the invention in coordination with one another.

Computer system 1300 may transmit and receive messages, data, and instructions, including program, i.e., application code, through communication link 1315 and communication interface 1314. Received program code may be executed by processor 1307 as it is received, and/or stored in disk drive 1310, or other non-volatile storage for later execution. In an embodiment, the computer system 1300 operates in conjunction with a data storage system 1331, e.g., a data storage system 1331 that contains a database 1332 that is readily accessible by the computer system 1300. The computer system 1300 communicates with the data storage system 1331 through a data interface 1333. A data interface 1333, which is coupled to the bus 1306, transmits and receives electrical, electromagnetic or optical signals that include data streams representing various types of signal information, e.g., instructions, messages and data. In embodiments of the invention, the functions of the data interface 1333 may be performed by the communication interface 1314.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for analyzing user generated content items in social media networks with trained intelligent systems, comprising:

at least one computing system identifying a user generated content item that is transmitted from a user computing device of a user in a social media network via a first network element, wherein the user generated content item includes at least a part that is expressed in a natural language;

the at least one computing system determining whether the user generated content item is to be further processed with additional processing at least by performing a first filtering process based in part or in whole upon a set of key terms or a set of filtering rules, wherein user generated content items determined not to be relevant are discarded from the additional processing;

when the user generated content item is determined to be relevant, the additional processing comprising:

performing, at an artificial intelligence module stored in memory and including or functioning in conjunction with at least one micro-processor of the at least one computing system, a segmentation process on the user generated content item by segmenting at least a part of the user generated content item into a plurality of units, storage of the plurality of units in a first location of memory of the computing system, and a second filtering process on the user generated content item, the second filtering process producing a smaller user generated content item by discarding a smaller objective portion of the user generated content item;

identifying or creating, with at least the artificial intelligence module, a response for the user generated content item at least by referencing at least results of one or more analyses of the plurality of units stored in a second location of the memory and corresponding to the smaller user generated content item in light of an environment in which the plurality of units are used and by calibrating the artificial intelligence module via at least validating the user generated content item, wherein the response includes at least a portion that is expressed in the natural language, and the one or more analyses and validating the user generated content item enhance accuracy of description of the user generated content item determined by the artificial intelligence module;

the at least one computing system storing the response in a database and indexing the response with a database index that facilitates subsequent retrievals of the response to subsequently identified user generated content items;

the at least one computing system transmitting, via a second network element, the response from the at least one computing system to a user computing device of the user in response to the user generated content item; and evaluating the response for the user generated content item at least by receiving user input data responding to the response from the user computing device and by reducing the user input data into reduced user input data, wherein reducing the user input data comprises filtering out one or more true elements, and analyzing the reduced user input data based in part or in whole upon a context in which the reduced user input data appears.

2. The computer implemented method of claim 1, further comprising the at least one computing system performing a post-response sentiment analysis.

3. The computer implemented method of claim 1, in which the at least one computing system identifying or creating the response for the user generated content item further comprises:

the at least one computing system identifying or receiving a plurality of user generated content items from the social media network; and the at least one computing system determining the relevant user generated content item by performing a process on the plurality of user generated content items.

4. The computer implemented method of claim 3, in which the process performed on the plurality of user generated content items comprises a filtering process to identify a subjective or relevant portion from at least some of the plurality of user generated content items or to remove an objective or irrelevant portion from the at least some of the plurality of user generated content items.

5. The computer implemented method of claim 3, in which the filtering process removes one or more objective elements from the at least some of the plurality of user generated content items, and one or more objective elements comprise one or more universally true statements.

6. The computer implemented method of claim 3, in which the at least one computing system that identifying or creating the response for the user generated content item further comprises:
   the at least one computing system forwarding data or information associated with the response or the relevant user generated content item for validation by a human expert; and
   the at least one computing system adjusting the process based at least in part upon a result of the validation by the human expert.

7. The computer implemented method of claim 1, in which the at least one computing system identifying or creating the response for the user generated content item further comprises at least one of:
   the at least one computing system classifying the user generated content item by using at least one of a syntactic natural language processor, support vector machines, and a Bayesian classifier including a Naïve Bayes classification process;
   the at least one computing system indexing the user generated content item in one or more data structures; and
   the at least one computing system indexing the response to the user generated content item in the one or more data structures or in other one or more data structures.

8. The computer implemented method of claim 1, in which the at least one computing system identifying the at least one computing system identifies or create the response for the user generated content item comprises at least one computing system determining one or more relations between the response and one or more products, one or more services, or a combination of the one or more products and the one or more services.

9. The computer implemented method of claim 1, in which the at least one computing system identifying the at least one computing system identifies or create a response for the user generated content item comprises at least one of:
   at least one computing system performing a process on one or more existing responses;
   at least one computing system indexing the on one or more existing responses;
   at least one computing system validating at least some of the one or more existing responses;
   at least one computing system classifying the one or more existing responses;
   at least one computing system identifying one or more templates associated with the social media network;
   at least one computing system identifying one or more presentation requirements associated with the social media network; and
   at least one computing system performing one or more statistical analyses using data or information associated with the response.

10. The computer implemented method of claim 1, in which the at least one computing system identifying or creating the response for the user generated content item further comprises the at least one computing system understanding an item by performing a natural language processing on the item.

11. The computer implemented method of claim 10, in which the natural language processing performed on comprises at least one of a lexical analysis, a syntax analysis, a semantics analysis, a context analysis, a data mining process, a classification process, a data mining process, a data dredging process, an assisted machine learning process, and an unassisted machine learning process.

12. The computer implemented method of claim 10, in which the item comprises the user generated content item, the response, or a user input.

13. The computer implemented method of claim 1, in which the at least one computing system transmitting the response to the user in response to the user generated content item comprises at least one of:
   the at least one computing system providing an interactive list of topics related to one or more products or one or more services in the response;
   the at least one computing system performing a fuzzy matching between a user input and data or information related to the one or more products or one or more services;
   the at least one computing system presenting a list of questions to the user to inquire into effectiveness or helpfulness of the response or user's knowledge;
   the at least one computing system providing a step-by-step guide, a trial version of the one or more products or one or more services, or an option for the user to request for live support; and
   the at least one computing system monitoring progress of the response after the review is transmitted to be reviewed by the user.

14. The computer implemented method of claim 1, further comprising the at least one computing system performing a post-response evaluation or improvement process after the response has been transmitted for the user to review.

15. The computer implemented method of claim 1, in which the at least one computing system performing the post-response evaluation or improvement process further comprising:
   the at least one computing system identifying a deviation between information associated with the user generated content item and available information associated with a product, a service, or a combination of the product and the service;
   the at least one computing system identifying a cause for the deviation between the user generated content item and the product, the service, or the combination of the product and the service; and
   the at least one computing system identifying an area for improvement for the product, the service, or the combination of the product and the service.

16. The computer implemented method of claim 1, in which the at least one computing system performing the post-response evaluation or improvement process further comprising:
   the at least one computing system performing a user sentiment analysis process;
   the at least one computing system improving accuracy of identifying or creating the response in response to the user generated content item based at least in part upon a result of the user sentiment analysis; and creating or generating another response with improved accuracy.

17. The computer implemented method of claim 1, in which the at least one computing system performing the user sentiment analysis process comprising at least one of:
the at least one computing system evaluating data related to the response or user's feedback;
the at least one computing system performing a language processing on the data; the at least one computing system removing a portion of the data from the data; and
the at least one computing system extracting another portion of the data from the data.

18. The computer implemented method of claim 17, in which the at least one computing system performing the user sentiment analysis process comprising at least one of:
the at least one computing system determining or classifying polarity of the user sentiment;
the at least one computing system improving accuracy of the user sentiment analysis by using an assisted or unassisted machine learning technique; and
the at least one computing system determining a feature or an aspect of a product or a service on which the user sentiment is expressed; and
the at least one computing system determining whether a follow-up response is to be sent for the user to review based at least in part upon the user sentiment.

19. The computer implemented method of claim 1, in which the at least one computing system that is used to generate the response also hosts the product or the service.

20. The computer implemented method of claim 1, further comprising an intermediary computing system hosting the product or the service, wherein the intermediary computing system is operatively connected to the at least one computing system that is used to generate the response.

21. An article of manufacture comprising a non-transitory computer readable storage medium storing thereupon a sequence of instructions which, when executed by at least one computing system having at least one processor, causes the at least one processor to perform a set of acts for analyzing user generated content items in social media networks with trained intelligent systems, comprising:
a first computer program code, a compiled version of which, when executed by the at least one computing system, causes the at least one computing system to:
identify a user generated content item that is transmitted from a user computing device of a user in a social media network via a first network element, wherein the user generated content item includes at least a part that is expressed in a natural language;
the at least one computing system determining whether the user generated content item is to be further processed with additional processing at least by performing a first filtering process based in part or in whole upon a set of key terms or a set of filtering rules, wherein user generated content items determined not to be relevant are discarded from the additional processing;
when the user generated content item is determined to be relevant, the first computer program code further cause the at least one computer system to perform the additional processing to:
perform, at an artificial intelligence module stored in memory and including or functioning in conjunction with at least one micro-processor of the at least one computing system, a segmentation process on the user generated content item by segmenting at least a part of the user generated content item into a plurality of units, storage of the plurality of units in a first location of memory of the computing system, and a second filtering process on the user generated content item, the second filtering process producing a smaller user generated content item by discarding a smaller objective portion of the user generated content item;
identify or create, with at least the artificial intelligence module, a response for the user generated content item at least by referencing at least results of one or more analyses of the plurality of units stored in a second location of the memory and corresponding to the smaller user generated content item in light of an environment in which the plurality of units are used and by calibrating the artificial intelligence module via at least validating the user generated content item, wherein the response includes at least a portion that is expressed in the natural language, and the one or more analyses and validating the user generated content item enhance accuracy of description of the user generated content item determined by the artificial intelligence module;
store the response in a database and index the response with a database index that facilitates subsequent retrievals of the response to subsequently identified user generated content items;
transmit, via a second network element, the response from the at least one computing system to a user computing device of the user in response to the user generated content item; and
evaluate the response for the user generated content item at least by receiving user input data responding to the response from the user computing device and by reducing the user input data into reduced user input data, wherein reducing the user input data comprises filtering out one or more true elements, and analyzing the reduced user input data based in part or in whole upon a context in which the reduced user input data appears.

22. The article of manufacture of claim 21, further comprising: a second computer program code, a compiled version of which, when executed by the at least one computing system, causes the at least one computing system to perform a post-response sentiment analysis.

23. The article of manufacture of claim 21, in which the first program code that is to cause the at least one computing system to identify or create the response for the user generated content item further comprises: a second computer program code, a compiled version of which, when executed by the at least one computing system, causes the at least one computing system to:
identify or receive a plurality of user generated content items from the social media network; and
determine the relevant user generated content item by performing a process on the plurality of user generated content items.

24. The article of manufacture of claim 23, in which the compiled version of the second computer program code, when executed by the at least one computing system, causes the at least one computing system to: forward data or information associated with the response or the relevant user generated content item for validation by a human expert; and adjust the process based at least in part upon a result of the validation by the human expert.

25. The article of manufacture of claim 21, in which the first program code that is to cause the at least one computing system to identify or create the response for the user generated content item further comprises at least one of: a second computer program code, a compiled version of which, when executed by the at least one computing system, causes the at least one computing system to: classify the user generated content item by using at least one of a syntactic natural language processor, support vector machines, and a Bayesian classifier including a Naïve Byaes classification engine; index the user generated content item in one or more data structures; and index the response to the user generated content item in the one or more data structures or in other one or more data structures.

26. The article of manufacture of claim 21, in which the first program code that is to cause the at least one computing system to identify or create the response for the user generated content item comprises: a second computer program code, a compiled version of which, when executed by the at least one computing system, causes the at least one computing system to: determine one or more relations between the response and one or more products, one or more services, or a combination of the one or more processes and the one or more services.

27. The article of manufacture of claim 21, in which the first program code that is to cause the at least one computing system to identify or create a response for the user generated content item comprises at least one of: a second computer program code, a compiled version of which, when executed by the at least one computing system, causes the at least one computing system to: perform a process on one or more existing responses; index the on one or more existing responses; validate at least some of the one or more existing responses; classify the one or more existing responses; identify one or more templates associated with the social media network; identify one or more presentation requirements associated with the social media network; and perform one or more statistical analyses using data or information associated with the response.

28. A system for analyzing user generated content items in social media networks with trained intelligent systems, comprising:

memory storing thereupon a program code;

a first computing system that comprises at least one processor and is configured to execute a sequence of instructions for executing the program code in conjunction with at least:

an artificial intelligent module executes the sequence of instructions to perform to identify a user generated content item that is transmitted from a user computing device of a user in a social media network via a first network element, wherein the user generated content item includes at least a part that is expressed in a natural language;

the first computing system executes the sequence of instructions to determine whether the user generated content item is to be further processed with additional processing at least by performing a first filtering process based in part or in whole upon a set of key terms or a set of filtering rules, wherein user generated content items determined not to be relevant are discarded from the additional processing;

when the user generated content item is determined to be relevant, the first computing system further performs the additional processing to invoke:

the artificial intelligent module stored in memory and including or functioning in conjunction with at least one micro-processor of the first computing system to execute the sequence of instructions to perform a segmentation process on the user generated content item by segmenting at least a part of the user generated content item into a plurality of units, storage of the plurality of units in a first location of the memory of the first computing system, and a second filtering process on the user generated content item, the second filtering process producing a smaller user generated content item by discarding a smaller objective portion of the user generated content item;

the artificial intelligence module to further execute the sequence of instructions to identify or create a response for the user generated content item at least by referencing at least results of one or more analyses of the plurality of units stored in a second location of the memory and corresponding to the smaller user generated content item in light of an environment in which the plurality of units are used and by calibrating the artificial intelligence module via at least validating the user generated content item, wherein the response includes at least a portion that is expressed in the natural language, and the one or more analyses and validating the user generated content item enhance accuracy of description of the user generated content item determined by the language processing mechanism;

an execution of the sequence of instructions to store the response in a database and index the response with a database index that facilitates subsequent retrievals of the response to subsequently identified user generated content items;

an execution of the sequence of instructions to transmit, via a second network element, the response from the first computing system to a user computing device of the user in response to the user generated content item; and an execution the sequence of instructions to evaluate the response for the user generated content item at least by receiving user input data responding to the response from the user computing device and by reducing the user input data into reduced user input data, wherein reducing the user input data comprises filtering out one or more true elements, and analyzing the reduced user input data based in part or in whole upon a context in which the reduced user input data appears.

29. The system of claim 28, in which the first computing system is further to work in conjunction with a sentiment analysis module to perform a post-response sentiment analysis.

30. The system of claim 28, in which the first computing system that executes the sequence of instructions to identify or create the response for the user generated content item is further to:

identify or receive a plurality of user generated content items from the social media network; and determine the relevant user generated content item by performing a process on the plurality of user generated content items.

31. The system of claim 30, in which the first computing system further executes the sequence of instructions to:

forward data or information associated with the response or the relevant user generated content item for validation by a human expert; and adjust the process based at least in part upon a result of the validation by the human expert.

32. The system of claim 28, in which the first computing system further executes the sequence of instructions to:

classify the user generated content item by using one or more of support vector machines, a syntactic natural language processing module, or a Bayesian classifier which further includes a Naïve Bayes module;

index the user generated content item in one or more data structures; or index the response to the user generated content item in the one or more data structures or in other one or more data structures.

33. The system of claim 28, in which the at least one computing system that executes the sequence of instructions to identify or create the response for the user generated content item is further to determine one or more relations between the response and one or more products, one or more services, or a combination of the one or more processes and the one or more services.

34. The system of claim 28, in which the at least one computing system that executes the sequence of instructions to identify or create a response for the user generated content item is further to:

perform a process on one or more existing responses;

index the on one or more existing responses;

validate at least some of the one or more existing responses;

classify the one or more existing responses;

identify one or more templates associated with the social media network;

identify one or more presentation requirements associated with the social media network; or perform one or more statistical analyses using data or information associated with the response.

\* \* \* \* \*